(12) United States Patent
Liu et al.

(10) Patent No.: US 7,437,222 B2
(45) Date of Patent: Oct. 14, 2008

(54) GIMBAL DISTURBANCE CALIBRATION AND COMPENSTION

(75) Inventors: Ketao Liu, Cerritos, CA (US); Justin Burch, Irvine, CA (US); Gregory S. Becker, Redondo Beach, CA (US); Patrick A. Nelson, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 460 days.

(21) Appl. No.: 11/191,805

(22) Filed: Jul. 28, 2005

(65) Prior Publication Data

US 2007/0027590 A1 Feb. 1, 2007

(51) Int. Cl.
*G01C 23/00* (2006.01)

(52) U.S. Cl. .............................. 701/3; 701/13; 701/222

(58) Field of Classification Search .................. 701/13; 342/354, 359; 244/165
See application file for complete search history.

(56) References Cited

U.S. PATENT DOCUMENTS

| | | | | |
|---|---|---|---|---|
| 3,368,411 A | * | 2/1968 | Sann | 74/5.4 |
| 4,082,005 A | * | 4/1978 | Erdley | 74/5 F |
| 4,596,989 A | * | 6/1986 | Smith et al. | 343/709 |
| 4,752,884 A | * | 6/1988 | Slafer et al. | 701/13 |
| 4,758,957 A | * | 7/1988 | Hubert et al. | 701/13 |
| 5,222,023 A | * | 6/1993 | Liu et al. | 701/13 |
| 5,587,714 A | * | 12/1996 | Chu et al. | 342/354 |
| 5,751,078 A | * | 5/1998 | Loewenthal | 310/36 |
| 6,000,661 A | * | 12/1999 | Price et al. | 244/164 |
| 6,175,783 B1 | * | 1/2001 | Strength et al. | 701/13 |
| 6,317,660 B1 | * | 11/2001 | Barker et al. | 701/13 |
| 6,339,734 B1 | * | 1/2002 | Liu et al. | 701/13 |
| 6,463,365 B1 | * | 10/2002 | Anagnost et al. | 701/13 |

OTHER PUBLICATIONS

Dahl, P.R., "A Solid Friction Model" TOR-158 (3107-18)-01, The Aerospace Corporation, May 1968.
Olsson et al., "Friction Models and Friction Compensation" European Journal of Control, Dec. 1988, No. 4 pp. 176-195.
Janiec, M., "Friction Compensation By The Use of Friction Observer", Master Thesis. Department of Automatic Control, Lund Institute of Technology, Oct. 2004.
Tao G. et al., "Adaptive Control of Nonsmooth Dynamic Systems", 2001, pp. 211-248.

* cited by examiner

*Primary Examiner*—J. Allen Shriver
*Assistant Examiner*—Helal A Algahaim
(74) *Attorney, Agent, or Firm*—Canady & Lortz LLP; Bradley K. Lortz

(57) ABSTRACT

Various embodiments of the present invention are directed to precision control system for spacecraft gimbaled payloads. Embodiments of the invention provide an innovative technique of calibrating gimbals disturbances to directly canceling gimbal control disturbances. Such a calibration system includes a receiver for receiving telemetry data for pointing a payload, a processor for calculating a disturbance parameter vector for a gimbal disturbance model with the telemetry data and a transmitter for transmitting the disturbance parameter vector to compensate for pointing error when applied in pointing the payload. The gimbal disturbance model comprises a harness stiffness term, a disturbance harmonics term and at least one friction hysteresis term. The telemetry data may be time matched prior to calculating the disturbance parameter vector. Typically, the telemetry data comprises gimbal angle and applied torque data and the disturbance parameter vector is calculated from convergence of an iterative gradient computation with the telemetry data.

23 Claims, 11 Drawing Sheets

GIMBAL DISTURBANCE CALIBRATION AND COMPENSTION

STATEMENT OF GOVERNMENT RIGHTS

This invention was made with Government support. The Government has certain rights in this invention.

BACKGROUND OF THE INVENTION

1. Field of the Invention

This invention relates to systems and methods for the control of spacecraft such as satellites. Particularly, this invention relates to systems and methods for pointing control of satellites.

2. Description of the Related Art

Precision attitude control of spacecraft is critical to provide accurate pointing of various antennas, sensors and other payloads. Imaging spacecraft such as intelligence satellites and weather satellites require precision payload pointing to achieve their mission objectives. Communication satellites require precision pointing of their RF and optical crosslinks to establish communication links between satellites. In addition, space based weapon platforms require precise payload pointing to target accurately. These various payloads are usually gimbaled and are precisely pointed by their gimbals control systems.

However, various influences introduce disturbances (e.g. torque disturbances) into such control systems. For example, disturbances can arise from harness across moving joints (harness residual torque and stiffness) and also from gimbal and motor ripples and cogging. Related, but distinct are the disturbances from gimbal, motor and harness running friction. In addition, there are also disturbances due to gimbal, motor and harness friction hysteresis. Thus, some major sources of pointing error for gimbaled payloads are the result of control disturbances within the gimbals themselves. They usually reduce the effectiveness of a gimbals control system, and thus may significantly decrease pointing accuracy of a gimbaled payload. The control system and spacecraft design must compensate for the negative effects of these influences.

Typically in the prior art, to reduce disturbances very high quality gimbals components and designing high bandwidth control systems are employed. Such high quality gimbals components are very expensive. In addition, though they generate fewer disturbances, these disturbances are still limiting factors of the pointing performance of a gimbals control system. Furthermore, high bandwidth spacecraft control systems are capable of achieving higher pointing accuracy. However, the improved pointing accuracy is usually achieved at the expense of control system robustness to various uncertainties of the control system. In addition, the bandwidth of a gimbaled control system is often limited by phase delays inherent in such a control system.

In view of the foregoing, there is a need in the art for high bandwidth control systems and methods which improve pointing performance. Further, there is a need for such control systems and methods to operate robustly. There is also a need for such control systems and methods to reduce the impact of phase delays in order to improve performance. As detailed hereafter, these and other needs are met by the present invention.

SUMMARY OF THE INVENTION

Various embodiments of the present invention are directed to precision control system for spacecraft gimbaled payloads. Embodiments of the invention provide an innovative technique of calibrating gimbals disturbances and directly canceling gimbal control disturbances. There are many advantages to this technique. For example, it allows accurate calibration of gimbals disturbance with only gimbals angular measurements or/and gimbals rate measurements. It also allows high pointing performance of gimbaled payloads without using more expensive gimbals components. It is estimated that embodiments of the invention can allow a payload gimbals control system to achieve approximately 0.005 degrees payload pointing accuracy with only approximately 0.01 ft-lb torque jitter for the maximum gimbals torque of approximately 2.4 ft-lb. This is almost an order of magnitude improvement over conventional gimbal control systems. Embodiments of the invention allow a payload gimbal control system to achieve pointing accuracy and tracking performance with reduced disturbances that would not be achievable with prior art techniques.

A typical embodiment of the invention comprises a receiver for receiving telemetry data for pointing a payload with a gimbal, a processor for calculating a disturbance parameter vector for a gimbal disturbance model of the gimbal with the telemetry data and a transmitter for transmitting the disturbance parameter vector to compensate for pointing error when applied in pointing the payload with the gimbal. The gimbal disturbance model comprises a harness stiffness term, a disturbance harmonics term and at least one friction hysteresis term. The telemetry data may be time matched prior to calculating the disturbance parameter vector. Typically, the telemetry data results from operating the gimbal with a constant rate command profile and a decaying sinusoidal angle profile and the disturbance parameter vector is calculated from convergence of an iterative gradient computation with the telemetry data.

The harness stiffness term of the gimbal disturbance model may comprise $T_0 + k_1(\theta - \theta_0) + k_2(\theta - \theta_0)^2$, where $T_0$ is the harness bias, $k_1$ is the harness stiffness, $k_2$ is the harness quadratic stiffness, $\theta$ is the gimbal angle and $\theta_0$ is the gimbal angle offset. The disturbance harmonics term of the gimbal disturbance model may comprise a gimbal torque independent term and a gimbal torque dependent term substantially proportional to applied gimbal torque. The gimbal torque independent term may be $$\sum_{i=1}^{m} a_i \sin(i\omega_0 \theta + \psi_i),$$

where $a_i$ is the i-th harmonic amplitude, $\omega_0$ is the fundamental spatial frequency, and $\psi_i$ is the i-th phase offset parameter. The gimbal torque dependent term may be $$T_{gimbals} \sum_{j=1}^{n} b_j \sin(j\omega_0 \theta + \phi_j),$$

where $T_{gimbals}$ is the applied gimbal torque, $b_j$ is the j-th harmonic amplitude, $\omega_0$ is the fundamental spatial frequency, and $\phi_j$ is the j-th phase offset parameter.

Embodiments of the invention may utilize a plurality of Dahl friction hysteresis terms within the gimbal disturbance model. For example, the Dahl friction hysteresis terms may be described by the differential equations, $$\frac{dT_{hysteresis\_bearing}}{dt} = \gamma_{bearing} \left| 1 - \frac{T_{hysteresis\_bearing} \text{sign}(\dot{\theta})}{T_{bearing}} \right|^n \dot{\theta},$$

$$\frac{dT_{hysteresis\_motor}}{dt} = \gamma_{motor} \left| 1 - \frac{T_{hysteresis\_motor} \text{sign}(\dot{\theta})}{T_{motor}} \right|^n \dot{\theta}$$

and $$\frac{dT_{hysteresis\_harness}}{dt} = \gamma_{harness} \left| 1 - \frac{T_{hysteresis\_harness} \text{sign}(\dot{\theta})}{T_{harness}} \right|^n \dot{\theta}$$

where t is time. $\gamma_{bearing}$, $\gamma_{motor}$, $\gamma_{harness}$ are the friction stiffness parameters of the bearing, motor, and harness respectively. $T_{hysteresis\_bearing}$, $T_{hysteresis\_motor}$, $T_{hysteresis\_harness}$ are the current modeled values of the bearing torque, hysteresis torque, and harness torque respectively. $T_{bearing}$, $T_{motor}$, $T_{harness}$ are the Columb friction levels of the bearing, motor, and harness respectively.

Similarly, a typical method embodiment of the invention includes receiving telemetry data for pointing a payload with a gimbal, calculating a disturbance parameter vector for a gimbal disturbance model of the gimbal with the telemetry data and transmitting the disturbance parameter vector to be used to compensate for pointing error when applied in pointing the payload with the gimbal. The gimbal disturbance model comprises a harness stiffness term, a disturbance harmonics term and at least one friction hysteresis term. The method may be modified consistent with the various apparatus embodiments.

In a related manner, embodiments of the invention are directed to the gimbal control system aboard the satellite. A typical gimbal control system embodiment of the invention comprises a torque-independent compensation processor for calculating a compensation torque from estimates of angular position and rate of a gimbal applied to a harness stiffness term, a disturbance harmonics term and at least one friction hysteresis term and a torque-dependent compensation processor for calculating a torque command for the gimbal from a total applied gimbal torque. The total applied gimbal torque comprises a sum of the compensation torque and a control torque value. Here also, the friction hysteresis term of the gimbal disturbance model may comprise a plurality of Dahl friction hysteresis terms. Further embodiments of the control system include an estimator for providing the estimates of the angular position and rate as well as angular acceleration estimate from the control torque value and a gimbal position measurement and a controller for determining the control torque value from the estimates of the angular position and rate as well as the angular acceleration estimate.

BRIEF DESCRIPTION OF THE DRAWINGS

Referring now to the drawings in which like reference numbers represent corresponding elements throughout.

DETAILED DESCRIPTION OF THE PREFERRED EMBODIMENT

1. Overview

Embodiments of the present invention are directed to torque calibration and compensation of gimbals which control pointing of various payloads, e.g. antenna, reflectors, sensors and any other space-borne pointed payload. The positioning of the payload relative to the supporting spacecraft body is typically controlled through a gimbal which manipulates the payload about two or more axes. Embodiments of the invention provide torque calibration results for the positioning gimbal. Pointing error may be improved with results of the torque calibration fed back into the gimbal control to compensate for errors.

Figure 1A:
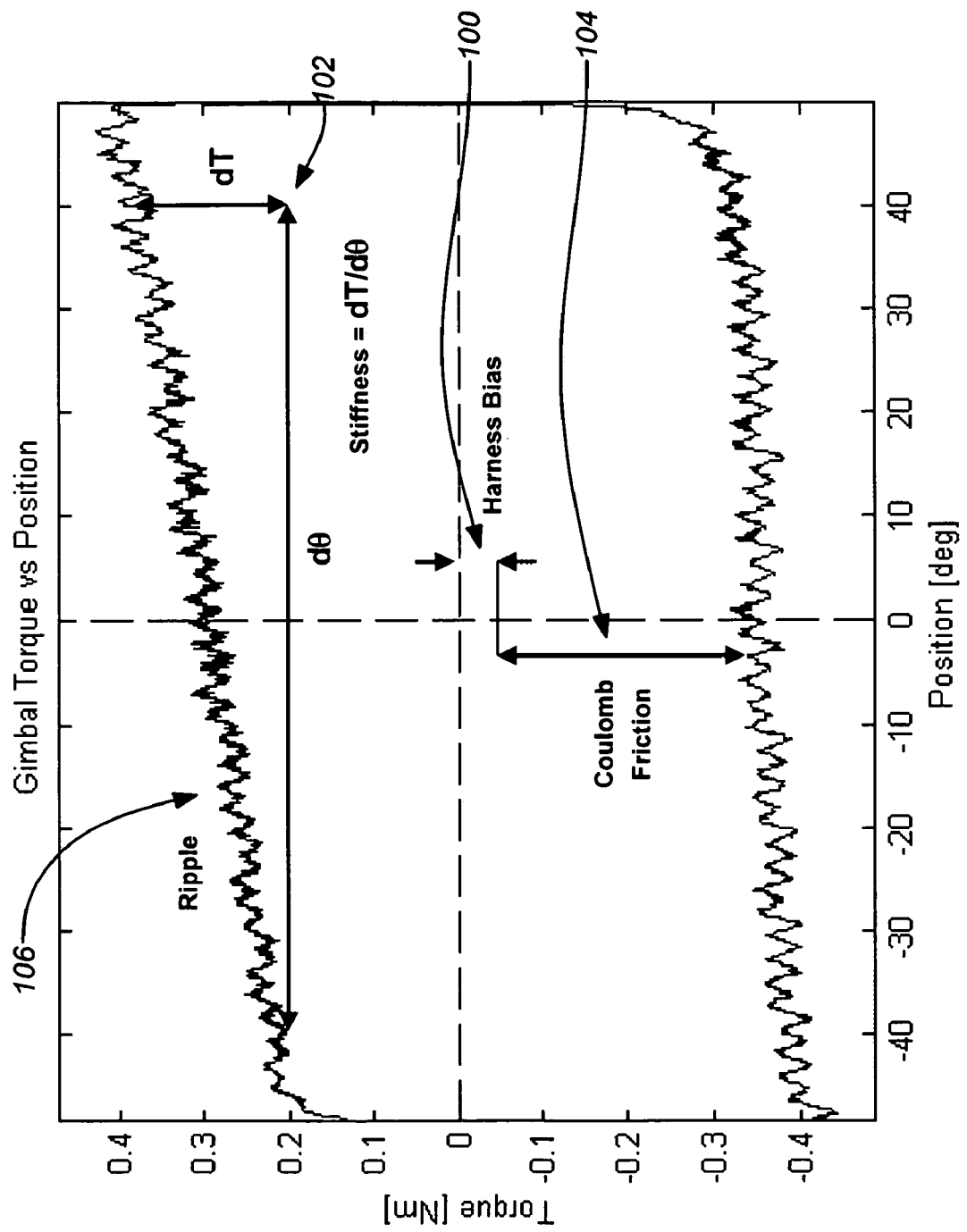
FIG. 1A shows graphs of an exemplary satellite gimbal torque including harness, running friction, stiffness and ripple/cogging.

FIG. 1A shows a composite measurement of the harness bias 100, the harness stiffness 102, Coulomb friction 104, and torque dependent and torque independent ripple 106. The harness bias 100 is the torque from the harness that is always present. Embodiments of the invention can estimate the harness bias 100 as the offset from zero of the average of the scan torques from moving the gimbal in both directions. The harness stiffness 102 is the torque rate of change as a function of angle. The ripple 106 estimation should employ both forward and reverse scan directions in order to separate out the two effects, since the phasing of the torque dependent harmonic torque disturbance is independent of direction. However, the torque independent harmonic phasing is dependent on direction. By simultaneously fitting the two sets of data, the two effects of the ripple 106 can be separated.

Figure 1B:
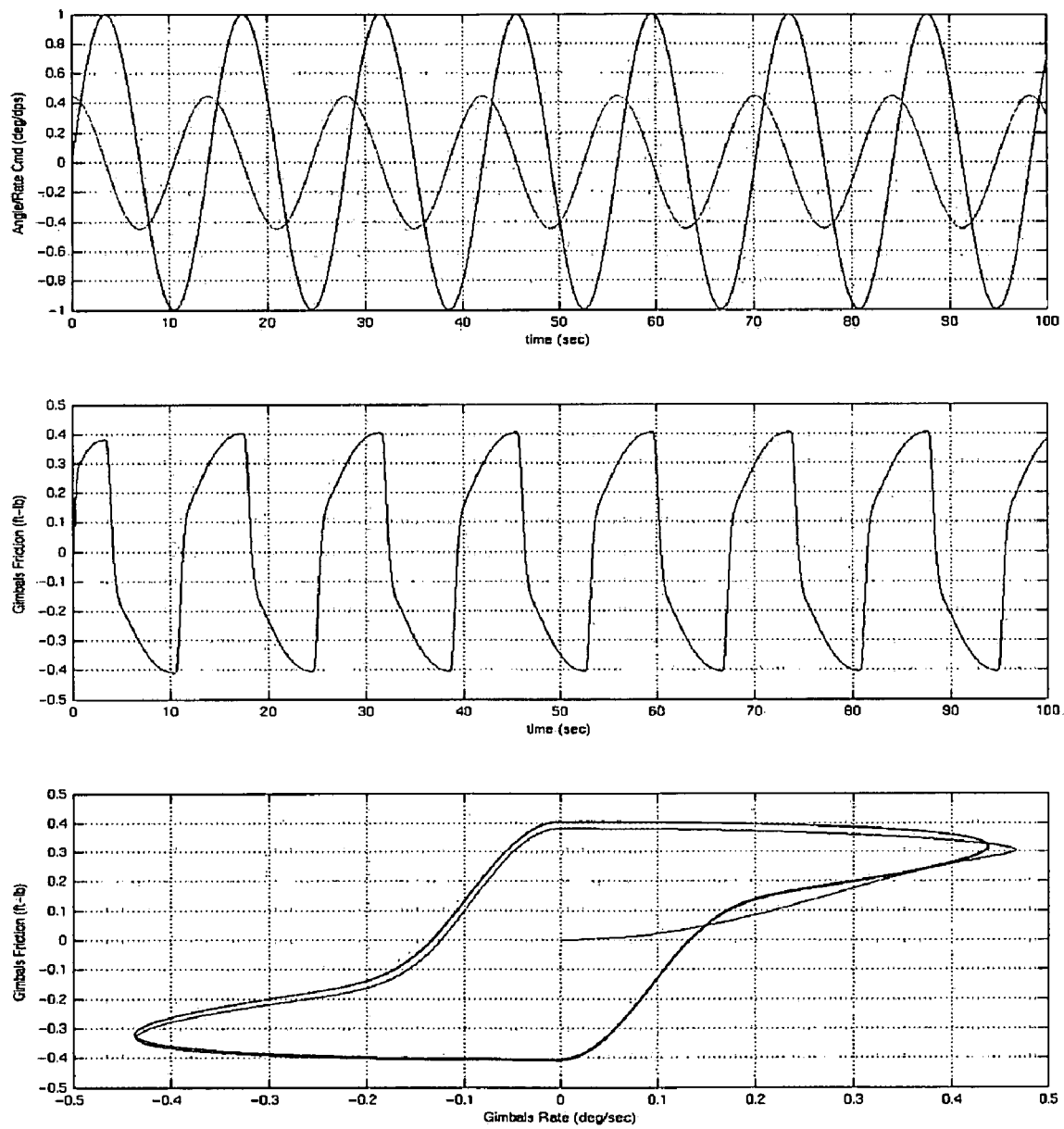
FIG. 1B shows graphs of an exemplary friction hysteresis of a satellite gimbal.

FIG. 1B shows exemplary graphs of a single source of friction hysteresis of a satellite gimbal. Previously, the objective has been to calibrate the slope parameter of the hysteresis for a related plot of the torque versus angle (rather than the torque versus rate shown) of a single hysteresis source. The friction stiffness parameters, $\gamma_{bearing}$, $\gamma_{motor}$, $\gamma_{harness}$, mentioned above, correspond to the slope of a torque versus angle plot for each hysteresis source. Thus, embodiments of the present invention identify multiple hysteresis sources, fitting a dynamic representation of a hysteresis model, rather than simply fitting a slope.

Torque calibration of a spacecraft gimbal, as typically performed with embodiments of the present invention, is performed offline. Accordingly, the calibration requires telemetry data to be time tagged in order to obtain a high accuracy calibration. For example, a data telemetry rate of approximately 4,000 bytes per second may be used to carry twenty 32-bit words at a rate of 50 Hz, sufficient to support the various command and data information utilized in the calibration.

Figure 2:
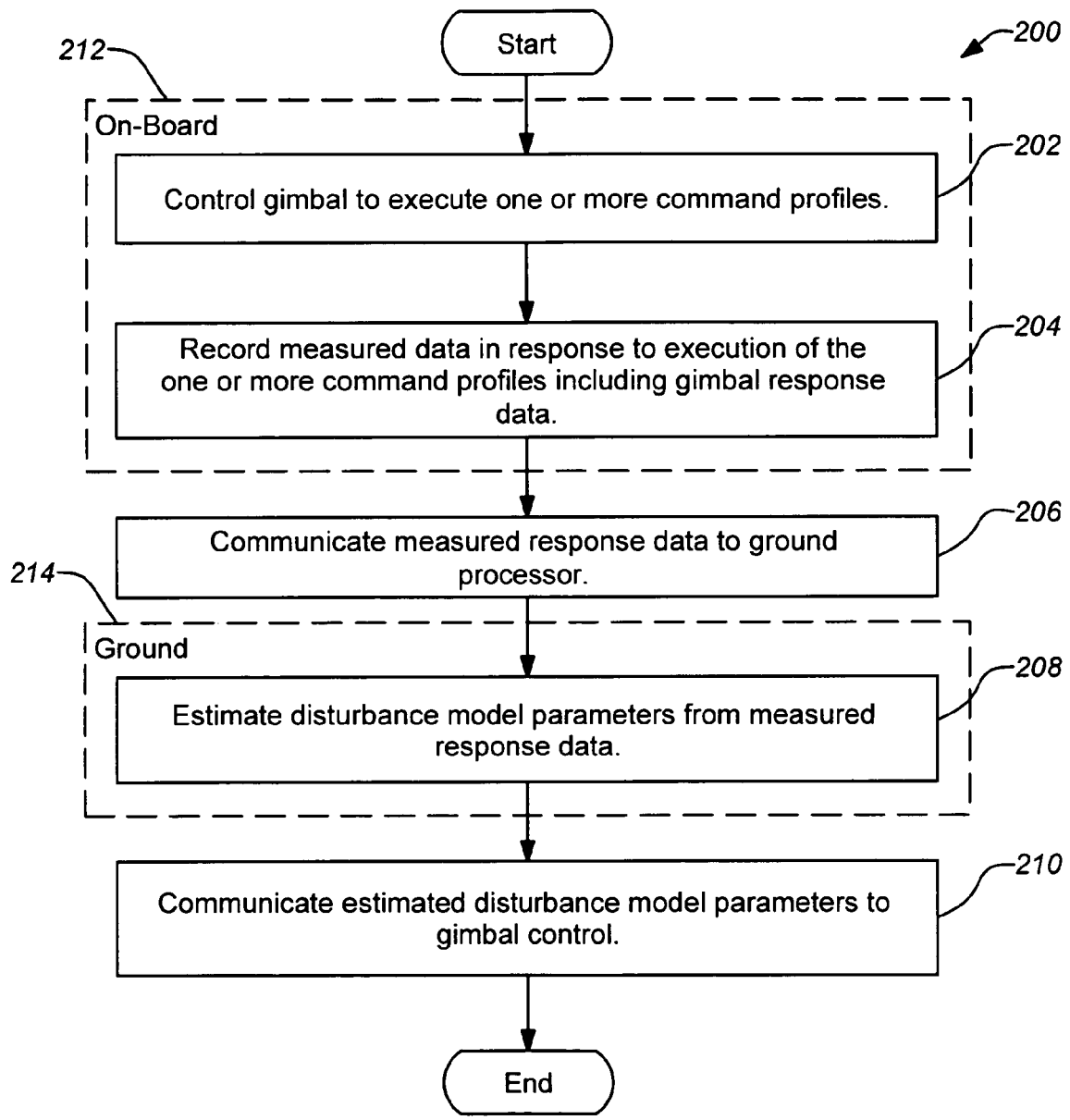
FIG. 2 illustrates an exemplary spacecraft pointing calibration process for embodiments of the invention.

FIG. 2 illustrates an exemplary spacecraft pointing calibration process 200 for embodiments of the invention. The operational characteristics of the gimbal must first be characterized in an on-board processor 212. The process 200 begins with on-board operation 202 of controlling a gimbal to execute one or more command profiles. In on-board operation 204, measured data, including gimbal response data, is recorded in response to execution of the one or more command profiles. The measured response data is communicated to the ground processor 214 in operation 206. In the ground processor 214, disturbance model parameters are estimated from the measured response data in ground operation 208. Following this, the estimated disturbance model parameters are communicated to the gimbal control back on-board the spacecraft in operation 210. The estimated disturbance model parameters may then be applied in the gimbal controller to improve pointing performance of payload. Details of various embodiments of the invention are provided hereafter.

2. Satellite System and Pointing Control

Figure 3:
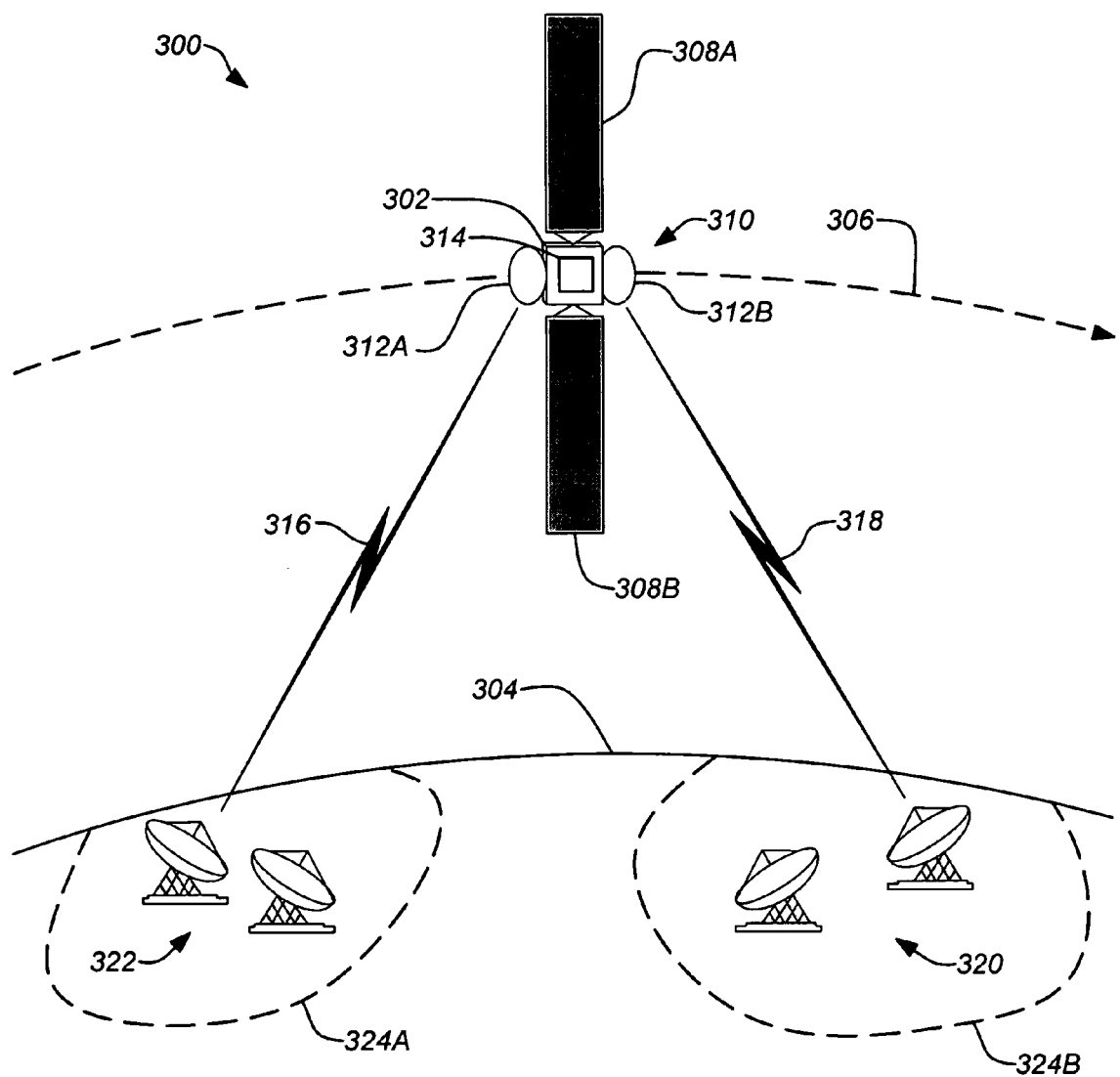
FIG. 3 illustrates a typical satellite system operable with an embodiment of the invention.

FIG. 3 schematically illustrates a typical satellite communication system 300 that can benefit from embodiments of the invention. A satellite 302 is disposed in an orbit of the Earth 304 along an orbital path 306 as shown. The orbital path 306 is geostationary for many communication satellites, positioning the satellite 302 over the equator in a stable orbit which precisely matches the Earth's rotation. Thus, the satellite 302 remains in a substantially fixed position relative to any point on the Earth 304. Such an orbit eliminates the need for satellite tracking from the Earth 304; all ground-based transmit and receive antenna may remain locked in a stationary pointing direction. It should be noted that the orbital arrangement, although typical, is not a functional requirement for embodiments of the invention. It is only necessary that a spacecraft is operating to point a payload of some type and producing the appropriate telemetry data (e.g. gimbal and inertial reference unit (IRU)) which can be communicated for analysis.

A typical satellite 302 comprises a power system which commonly includes solar panels 308A, 308B to collect solar energy and convert it to electrical energy. Batteries (not shown) may be used to store the electrical energy. An essential component of any type of communication satellite 302 is an antenna system 310. The antenna system 310 typically includes one or more reflectors 312A, 312B for reflecting and focusing electromagnetic signals transmitted to and received from the Earth 304 and/or possibly other satellites. The satellite 302 also includes some type of amplifier system 314 for amplifying a received signal 316 with enough power so that the transmitted signal 318 is capable of being received by ground-based antenna 320. In addition to payload communications to a ground-based antenna, embodiments of the invention transmit telemetry data which may comprise inertial reference unit (IRU) data, positioner resolver data, gimbal drive electronics data and any other significant data related to pointing the payload, e.g. one or more of the reflectors 312A, 312B.

In the typical communication system 300, one or more ground-based transmitters 322 transmit signals 318 to the receive reflector 312A of the antenna system 310. The communication system 300 is designed such that the receive reflector 312A operates over a specified coverage area 324A. Ground-based transmitters 322 must be located within the coverage area 324A in order for their transmitted signals 316 (i.e. uplink signals) to be properly received by the satellite 302. Similarly, the transmit reflector 312B of the antenna system 110 operates over a specified coverage area 324B where ground-based receivers 320 must be located in order to properly receive the transmitted signal 318 (i.e. downlink signal) from the transmit reflector 312B of the antenna system 310. Coverage areas 324A, 324B may encompass distinct regions or they may intersect depending upon the application and the implementation technique. For example, a very common coverage region for communication systems is the region defined by the continental U.S. (CONUS), not including Alaska and Hawaii.

It is important to note that command signals to control the satellite may be transmitted and received between the satellite 302 and a single ground location. Various embodiments of the invention as described hereafter contemplate such a co-located transmitter and receiver for command signals.

Figure 4:
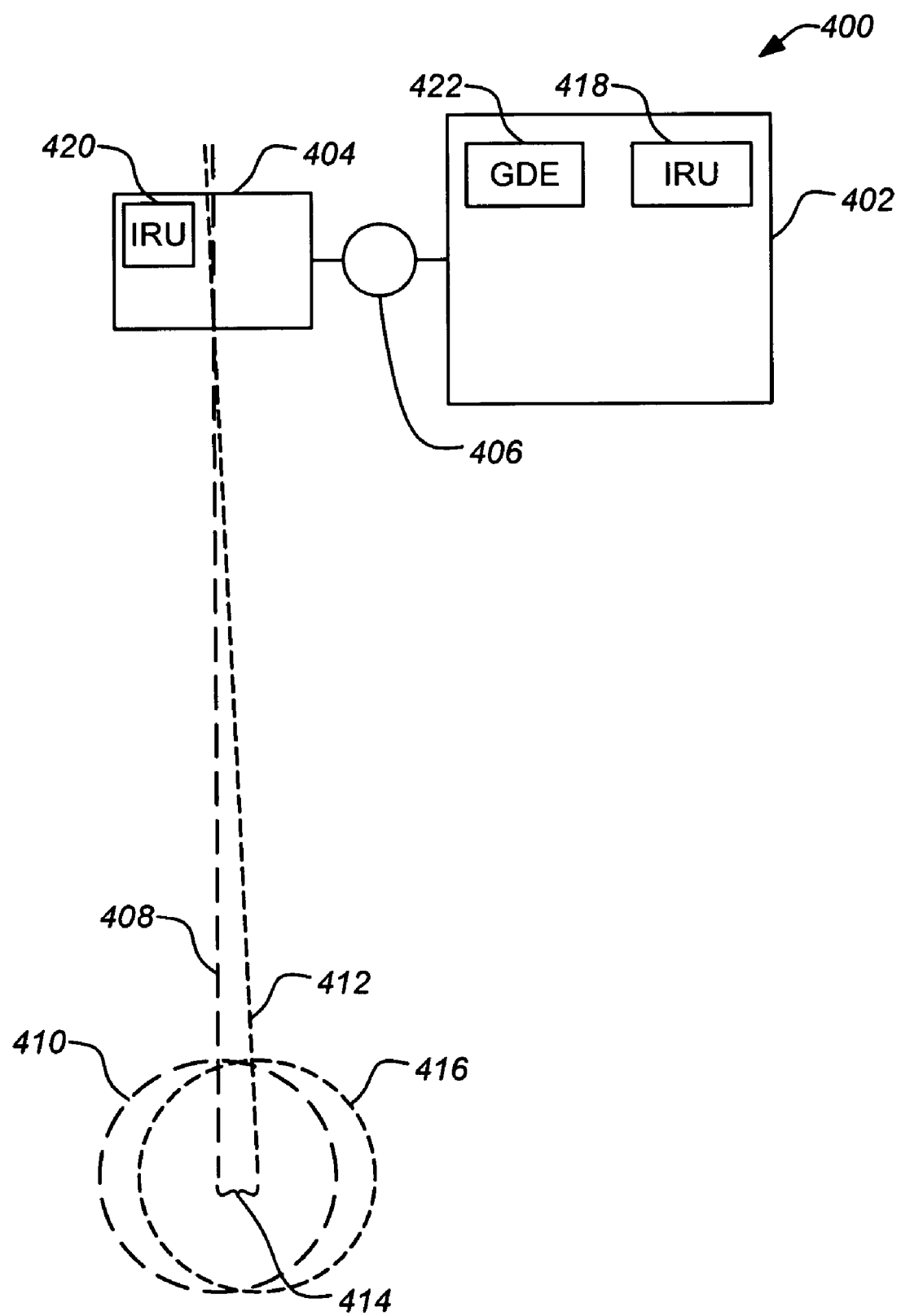
FIG. 4 is a schematic of a typical satellite operable with an embodiment of the invention.

FIG. 4 is a schematic of a typical satellite 400 operable with an embodiment of the invention. The satellite 400 is typical of the satellite 302 as shown in the communication system 300 of FIG. 3. The satellite 400 includes a satellite body 402 and a positionable payload 404, e.g. antenna, reflectors, sensors and any other space-borne pointed payload. The payload 404 is positioned relative to the satellite body 402 through an interconnecting gimbal 406 which provides positionability of the payload 404 in at least two axes. With ideal positioning of the payload 404 by the gimbal 406, the ideal payload boresight 408 is directed at a distant target region 410, e.g. on the Earth. However, as previously discussed, certain pointing errors arise in the manipulation of the payload 404 with the gimbal 406 which result in an real boresight 412 which exhibits some pointing error 414 from the ideal payload boresight. Accordingly, the actual coverage region 416 provides a lesser portion of the target region 410.

In order to function, embodiments of the invention require a variety of sensor information. In a typical embodiment, the sensor information is telemetry data communicated to a ground base which may comprise data from an inertial reference unit 418 providing position information of the spacecraft body 402. In addition, a second inertial reference unit 420 may provide position information of the payload 404. Other sensor information may include positioner resolver from the gimbal 406 as well as data from the gimbal drive electronics 422 and any other significant data related to pointing the payload.

Figure 5:
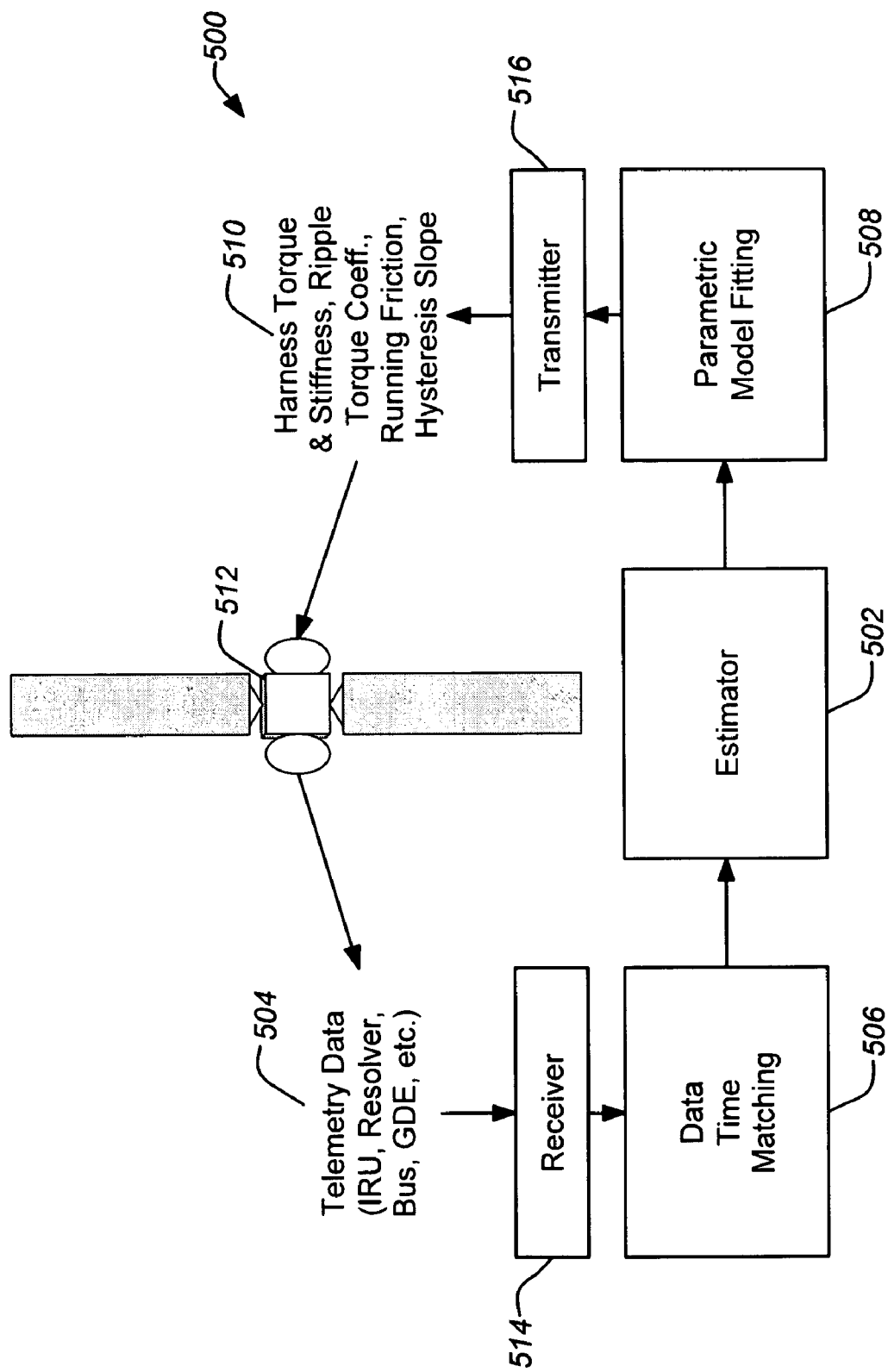
FIG. 5 is a block diagram describing the general process for a disturbance torque calibration.

FIG. 5 is a block diagram describing the system for a torque disturbance calibration. The system 500 may implement the process 200 outlined in FIG. 2. In the system 500, a processor including an estimator 502 with special computation structures may be used to estimate disturbance torque off line (e.g. on the ground) using telemetry data 504 (such as applied torque and gimble angle data) received from the spacecraft 512. Thus, the telemetry data 504 comprising a plurality of data sets received by the receiver 514, may first be time matched processed 506 for synchronization by time matching the telemetry data between the different sets before being operated on by the estimator 502. The time matching processing 506 is optional if other techniques known to those skilled in the art are employed to synchronize the data. For example, the data may be received in real time, already synchronized if the telemetry rates are high enough. Alternately, the time matching may also be performed on-board the satellite and the data buffered before transmission to the ground. The output of the estimator 502 is then communicated to a parametric model fitting algorithm 508, used to extract operating parameters such as harness torque, harness stiffness, ripple/cogging torque coefficients, running friction and hysteresis slope parameters. Telemetry data may filtered prior to curve fitting both torque and angle measurements as part of the processing. The operating parameters 510 are then transmitted back to the satellite 512 with the transmitter 516, e.g. in to the gimbal drive electronics (GDE), and applied to improve payload pointing with the disturbance torque compensation.

3. Gimbal Disturbance Model

For various embodiments of the present invention, gimbal disturbance, $T_d$, may be modeled as follows:

$$T_d = T_{stiffness} + T_{harmonics} + T_{hysteresis},$$

where $T_{stiffness}$ is due to harness stiffness of the gimbals and is modeled as $$T_{stiffness} = T_0 + k_1(\theta - \theta_0) + k_2(\theta - \theta_0)^2,$$

where $T_0$ is the harness bias, $k_1$ is the harness stiffness, $k_2$ is the harness quadratic stiffness, $\theta$ is the gimbal angle and $\theta_0$ is the gimbal angle offset.

$T_{harmonics}$ is due to disturbance harmonics of the gimbal torque and may be modeled as $$T_{harmonics} = \sum_{i=1}^{m} a_i \sin(i\omega_i \theta + \psi_i) + T_{gimbals} \sum_{j=1}^{n} b_j \sin(j\omega_0 \theta + \phi_j).$$

The first term is the gimbal torque independent term where $a_i$ is the i-th harmonic amplitude, $\omega_0$ is the fundamental spatial frequency, and $\psi_i$ is the i-th phase offset parameter. The second term is proportional to the gimbal applied torque, $T_{gimbals}$, where $b_j$ is the j-th harmonic amplitude, $\omega_0$ is the fundamental spatial frequency, and $\phi_j$ is the j-th phase offset parameter.

$T_{hysteresis}$ is due to hysteresis behavior of the gimbal bearing friction, motors and harness and may be modeled as $$T_{hysteresis} = T_{hysteresis\_bearing} + T_{hysteresis\_motor} + T_{hysteresis\_harness}$$

$$\dot{T}_{hysteresis\_bearing} = \gamma_{bearing} \left| 1 - \frac{T_{hysteresis\_bearing} \text{sign}(\dot\theta)}{T_{bearing}} \right|^n \dot\theta$$

$$\dot{T}_{hysteresis\_motor} = \gamma_{motor} \left| 1 - \frac{T_{hysteresis\_motor} \text{sign}(\dot\theta)}{T_{motor}} \right|^n \dot\theta$$

$$\dot{T}_{hysteresis\_harness} = \gamma_{harness} \left| 1 - \frac{T_{hysteresis\_harness} \text{sign}(\dot\theta)}{T_{harness}} \right|^n \dot\theta$$

where t is time. $\gamma_{bearing}$, $\gamma_{motor}$, $\gamma_{harness}$ are the friction stiffness parameters of the bearing, motor, and harness respectively. $T_{hysteresis\_bearing}$, $T_{hysteresis\_motor}$, $T_{hysteresis\_harness}$ are the current modeled values of the bearing torque, hysteresis torque, and harness torque respectively. $T_{bearing}$, $T_{motor}$, $T_{harness}$ are the Coulomb friction levels of the bearing, motor, and harness respectively.

Notably, the foregoing model implements a multi-termed hybrid of more elementary disturbance models previously developed, e.g. the Dahl solid and/or dynamic friction model. Embodiments of the present invention may comprise a gimbal disturbance model where friction hysteresis comprises a plurality of Dahl friction hysteresis terms, e.g. multiple copies of the Dahl friction model. For example, embodiments of the invention may employ a Dahl friction term each for bearing, motor and harness hysteresis disturbances as shown above.

The parameters employed in disturbance compensation processing in the gimbal control software on board the spacecraft may comprise uploadable constants. This allows the parameters to be defined specifically for the post-launch, on-orbit environment of the payload and gimbal assembly. The calibration process may be performed separately for the roll and pitch axes of the spacecraft. The steps to calibrate these parameters may be divided into separate algorithms corresponding to the different disturbances in the disturbance compensation. Development of the foregoing composite model and application to pointing calibration is described in detail in the following sections.

4. Gimbal Disturbance Calibration

Gimbal disturbance calibration may be performed assuming that the gimbal angle $\theta$ and gimbal applied torque $T_{gimbals}$ measurements are available either from gimbals tests or from actual gimbal operation. The gimbal angular rate $\dot\theta$ measurements can make the calibration simpler. However, rate measurements are not available in many cases. Therefore, embodiments of the invention comprise calibration formulations operable when angular rate measurements are not available. Gimbal angular dynamics in response to gimbal torque may be described by the equation, $$\theta(t) = f(\vec{p}, T_{gimbals}(t-\tau)), \tau \leq t,$$

where $\vec{p}$ is the disturbance parameter vector that defines the disturbances due to harness, harmonics and hysteresis, and is described as $$\vec{p} = [T_0, k_1, k_2, \alpha_1, \psi_1, \ldots, \alpha_m, \psi_m, b_1, \phi_1, \ldots, b_n, \phi_n, \gamma_{bearing}, T_{bearing}, \gamma_{motor}, T_{motor}, \gamma_{harness}, T_{harness}].$$

Assume that gimbals angle and torque measurements are available as follows, $$\theta(t): \theta(t_0), \theta(t_1), \ldots, \theta(t_N)$$

$$T_{gimbals}(t): T_{gimbals}(t_0), T_{gimbals}(t_1), \ldots, T_{gimbals}(t_N)$$

The calibration may be performed through a gradient search, where the gradient matrix may be computed at the k-th search cycle via simulations as follows, $$\hat\theta_k(t) = f\left(\vec{\hat p}_k, T_{gimbals}(t-\tau)\right),$$

$$\tau \leq t$$

$$\hat\Theta(\vec{\hat p}_k) = \begin{bmatrix} \hat\theta_k(t_0) \\ \hat\theta_k(t_1) \\ \vdots \\ \hat\theta_k(t_N) \end{bmatrix}$$

-continued $$\left.\frac{\nabla \vec{\Theta}}{\nabla \vec{p}}\right|_k = \left[ \frac{\vec{\Theta}\left(\vec{p}_k + \Delta\vec{p}_k I_1\right) - \vec{\Theta}(\vec{p}_k)}{\Delta\vec{p}_k I_1} \quad \frac{\vec{\Theta}\left(\vec{p}_k + \Delta\vec{p}_k I_2\right) - \vec{\Theta}(\vec{p}_k)}{\Delta\vec{p}_k I_2} \quad \cdots \quad \frac{\vec{\Theta}\left(\vec{p}_k + \Delta\vec{p}_k I_m\right) - \vec{\Theta}(\vec{p}_k)}{\Delta\vec{p}_k I_m} \right]$$

where, $$\Delta\vec{p}_k = \left[ \Delta\hat{T}_0, \Delta\hat{k}_1, \Delta\hat{k}_2, \Delta\hat{a}_1, \Delta\hat{\psi}_1, \cdots, \Delta\hat{b}_n, \Delta\hat{\phi}_n, \Delta\hat{\gamma}_{bearing}, \Delta\hat{T}_{bearing}, \cdots \right]$$

$I_1 = [1, 0, \cdots, 0]$, $I_2 = [0, 1, 0, \cdots, 0], \cdots$, $I_m = [0, \cdots, 0, 1]$ and $$\hat{\theta}_k(t) = f\left(\vec{p}_k, T_{gimbals}(t-\tau)\right),$$

$\tau \le t$ and angular predictions after parameter perturbations may be generated by simulations. At the k-th gradient search cycle, the estimated disturbance parameter vector may be updated as follows, $$\vec{p}_{k+1} = \vec{p}_k + \alpha \left[ \left(\left.\frac{\nabla \vec{\Theta}}{\nabla \vec{p}}\right|_k\right)^T \left.\frac{\nabla \vec{\Theta}}{\nabla \vec{p}}\right|_k \right]^{-1} \left(\left.\frac{\nabla \vec{\Theta}}{\nabla \vec{p}}\right|_k\right)^T \left(\vec{\Theta} - \hat{\vec{\Theta}}(\vec{p}_k)\right)$$

$$\vec{\Theta} = \begin{bmatrix} \theta(t_0) \\ \theta(t_1) \\ \vdots \\ \theta(t_N) \end{bmatrix}$$

The calibration computation is complete when final estimated disturbance parameters are obtained at the convergence of the gradient search. The overall calibration process is described as follows.

Figure 6A:
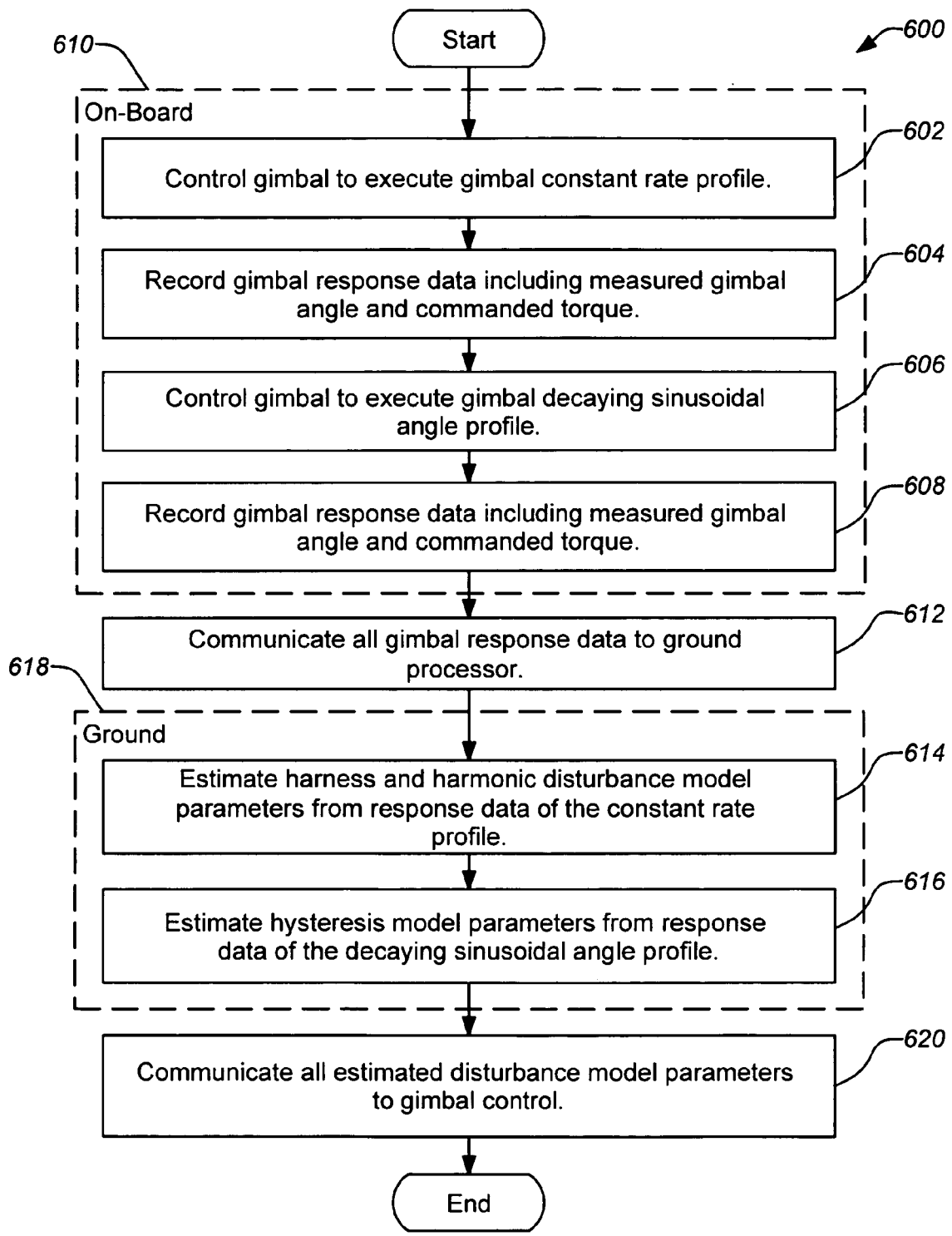
FIG. 6A illustrates an exemplary satellite pointing calibration system flow for embodiments of the invention applying constant rate and decaying sinusoid gimbal profiles.

FIG. 6A illustrates an exemplary satellite pointing calibration system flow 600 for embodiments of the invention applying constant rate and decaying sinusoid gimbal profiles. This system flow 600 elaborates on the general system flow 200 previously described in FIG. 2 by commanding the gimbal with constant rate and decaying sinusoidal profiles to in order to properly calibrated pointing. In this case, the operational characteristics of the gimbal are also characterized in an on-board processor 610. The system flow 600 begins with on-board operation 602 of controlling a gimbal to execute a constant rate profile. In on-board operation 604, measured data, including gimbal response data, is recorded in response to execution of the constant rate profile. (Note that characterizing the constant rate profile response may include operating the gimbal both clockwise and counterclockwise under the profile.) Next, in on-board operation 606 the gimbal is controlled to execute a decaying sinusoidal angle profile and in on-board operation 608, measured data, including gimbal response data, is recorded in response to execution of the decaying sinusoidal angle profile. All the measured response data is communicated to the ground processor 618 in operation 612. In the ground processor 618, harness and harmonic disturbance model parameters are estimated from response data of the constant rate profile in ground operation 614. Similarly, hysteresis model parameters are estimated from response data of the decaying sinusoidal angle profile in ground operation 616. Following this, all the estimated disturbance model parameters are communicated to the gimbal control back on-board the spacecraft in operation 618. The estimated disturbance model parameters may then be applied in the gimbal controller to improve pointing performance of payload.

Figure 6B:
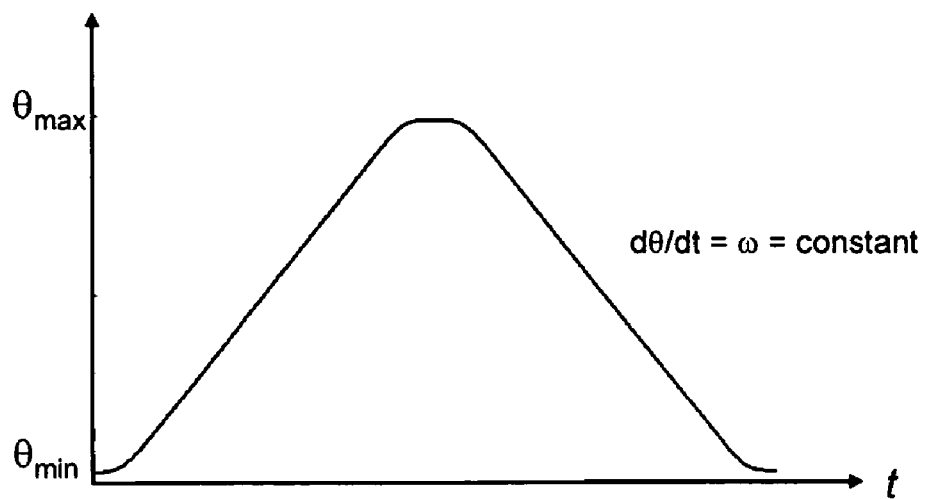
FIGS. 6B and 6C respectively illustrate exemplary constant rate and decaying sinusoidal angle profiles.
Figure 6C:
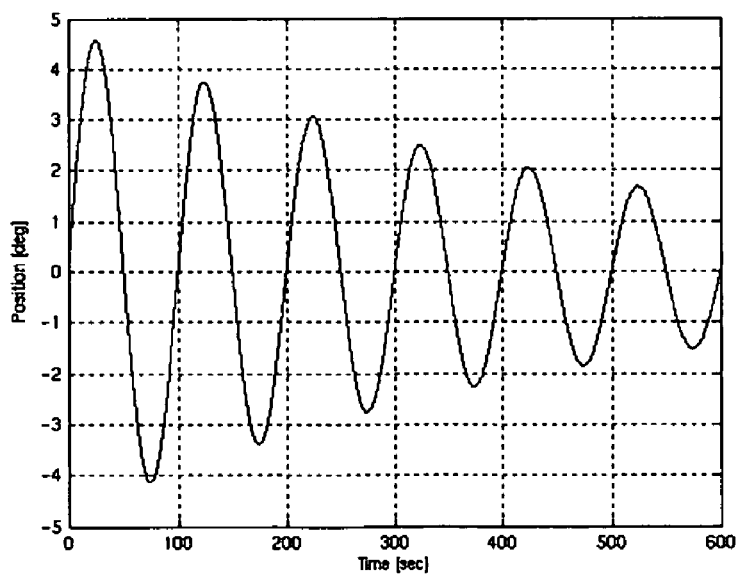

FIGS. 6B and 6C respectively illustrate exemplary constant rate and decaying sinusoidal angle profiles. The constant rate profile of FIG. 6A is be defined simply by ω=a constant. The decaying sinusoidal angle profile may be defined by θ=A sin(2πft)exp(-t/τ) and ω=2πfA cos(2πft)exp(-t/τ)-(1/τ)A sin(2πft)exp(-t/τ) where θ,ω are the commanded gimbal position and rate, respectively, A is the amplitude in degrees, f is the frequency in Hertz and τ is the decay rate in seconds.

The response data may under some preprocessing prior to analysis on the ground. For example, the constant rate profile response data may be preprocessed by filtering the raw angle and torque data from the gimbal, e.g. with a $4^{th}$ order Butterworth filter. Following this, angle and torque data can be extracted across the constant rate portion of the bidirectional scan (clockwise and counterclockwise movement).

With the preprocessed data, the harness model parameters can be estimated. In this case, a least-squares fit may be applied to the preprocessed constant rate data (clockwise and counterclockwise data) to derive the parameters based on the harness mathematical model. The final harness model parameters can be determined by averaging the results from each direction.

The harmonic model parameters can likewise be estimated from the preprocessed data of the constant rate profile response. Here also, a least-squares fit of the harmonic data for both the clockwise and counterclockwise constant rate profiles may be performed base on the harmonic mathematical model. The resulting coefficients may then be transformed to the harmonic disturbance model parameters.

The response data for the decaying sinusoidal angle profile may also under some preprocessing, e.g. applying a 4th order Butterworth filter to the raw angle and torque response data. Following this, stiffness (harness) and harmonic disturbance data may be removed from the torque data using estimated parameters to complete the preprocessing.

Determination of the hystersis disturbance model parameters may be accomplished through a gradient analysis. A gradient fit of the hysteresis model parameters is calculated from the preprocessed response data for the decaying sinusoidal angle profile applied to the hysteresis mathematical model. An estimated rate is determined from the angle response data. The estimated rate is applied to the hysteresis model employing an initial guess of hysteresis model parameters to yield a predicted torque. The predicted torque is compared with the preprocessed (actual) torque to determine an update to the hysteresis model parameters. The gradient search is iterated in this manner until the convergence criteria is met.

The following subsections further detail the calibration process separately for static friction, harness stiffness and torque ripple disturbances as well as hysteresis disturbances.

4.1 Static Friction, Harness Stiffness and Torque Ripple Disturbances

The following equations describe the process applied in the disturbance compensation for static friction, harness stiffness and torque ripple disturbances. These disturbances are present for both roll and pitch axes; however, generalized expressions are shown below.

The stiffness torque created by the gimbal harness may be modeled as a torsion spring. The equation included in the disturbance compensation software may be as follows.

$$T_H = T_{H\_0} + K_{H1}(\theta_{est} - \phi_H) + K_{H2}(\theta_{est} - \phi_H)^2 \quad \text{Eq. 1}$$

where $T_{H\_0}$ is harness residual torque, $K_{H1}$ and $K_{H2}$ are stiffness coefficients, $\theta_{est}$ is measured position and $\phi_H$ is a phase offset.

As shown in Eq. 1, the parameters for estimation of harness torque compensation are coefficients to a second order polynomial and a phase term. However, this phase term is not necessary. Thus, disturbance compensation software may be over parameterized; this term may be captured by the other coefficients. The following expansion of Eq. 2 illustrates this point.

$$\begin{aligned}
T_H &= T_{H\_0} + K_{H1}(\theta_{est} - \phi_H) + \\
&\quad K_{H2}(\theta_{est} - \phi_H - \phi_H)^2 \\
&= T_{H\_0} + (K_{H1}\theta_{est} - K_{H1}\phi_H) + \\
&\quad K_{H2}(\theta_{est}^2 - 2\phi_H\theta_{est} + \phi_H^2) \\
&= T_{H\_0} + K_{H1}\theta_{est} - K_{H1}\phi_H + \\
&\quad K_{H2}\theta_{est}^2 - 2K_{H2}\phi_H\theta_{est} + K_{H2}\phi_H^2 \\
&= (T_{H\_0} - K_{H1}\phi_H + K_{H2}\phi_H^2) + \\
&\quad (K_{H1} - 2K_{H2}\phi_H)\theta_{est} + K_{H2}\theta_{est}^2 \\
&= T'_{H\_0} + K'_{H1}\theta_{est} + K'_{H2}\theta_{est}^2
\end{aligned} \quad \text{Eq. 2}$$

Estimating parameters for a second-order polynomial, without a phase offset is sufficient and less burden on the processing. The uploaded value of $\phi_H$ may be set to zero in the software.

The torque ripple disturbance of the gimbal may be divided into torque independent ripple and torque dependent ripple compensation. The torque independent ripple disturbance may be modeled as follows.

$$T_{ripple,TI} = \sum_{n=1}^{5} P_{TI,n}\sin(k_n\theta_{est} + \phi_{TI,n}) \quad \text{Eq. 3}$$

where n specifies different harmonics, k is the spatial frequency of the harmonic, $P_{TI}$ is the magnitude, $\phi_{TI}$ is the phase and $\theta_{est}$ is the measured position. The magnitude and phases are estimated for specified harmonic frequencies. Torque dependent ripple disturbance is modeled as follows.

$$T_{ripple,TD} = (T^{FFW}K_{Trq} + T^{cnt})\sum_{n=1}^{5} P_{TD,n}\sin(k_n\theta_{est} + \phi_{TD,n}) \quad \text{Eq. 4}$$

where n specifies different harmonics, k is the spatial frequency of the harmonic, $P_{TD}$ is the magnitude, $\phi_{TD}$ is the phase and $\theta_{est}$ is the measured position. $T^{FFW}$ is feedforward torque from T&C and $T^{cnt}$ is control torque from the software controller. $K_{Trq}$ is a conversion factor. The magnitude and phases are estimated for specified harmonic frequencies.

The identification of the parameters may be accomplished in the following manner. Stiffness torque parameters are identified using a least squares fit. The measured commanded torque is detrended from these parameters. The detrended torque is then processed to determine torque ripple parameters. A fast Fourier transform (FFT) analysis of the detrended torque is employed to aid in identifying dominant ripple harmonics. A least squares fit is performed to identify parameters for the selected harmonic frequencies.

Prior to the execution of the calibration algorithms, the collected gimbal data may undergo some preprocessing. The position and torque data may be separated into clockwise (CW) and counterclockwise (CCW) sets, according to user identified indices. Filtering out higher frequency noise can be accomplished using a mathematics software tool function (e.g. MATLAB "filtfilt"). Similarly, the coefficients for a fourth-order Butterworth filter may be obtained (e.g. using the MATLAB function "butter"). Inputs to this function included a cut-off frequency and sample frequency. Position data vectors may be screened for repeated values. Stiffness torque parameters and ripple torque parameters can be estimated from the filtered data. Raw (unfiltered) torque data may be plotted as an FFT later in algorithm processing.

The data is filtered based on a user specified cut-off frequency. The selection of this cut-off is important, as the temporal frequencies of ripple disturbances are rate dependent. The following equation illustrates the determination of temporal frequency based on gimbal rate and harmonic number.

$$\left. \begin{aligned} k &= 32 + n \cdot 32 \\ P &= 360/k \\ T &= P/\omega_{gimbal} \\ F &= 1/T \end{aligned} \right| \to F_n = \frac{1}{\left(\frac{360}{32 + n \cdot 32}\right)/\omega_{gimbal}}$$

where 32 is the number of pole pairs in the gimbal motor, n is the harmonic number. n=0,1,2,3 . . . (Fundamental represented by θ), k is the spatial frequency (cycles/rev), P is the spatial period (degrees), ω is the gimbal rate (deg/s), T is the temporal period (seconds), F is the temporal frequency (Hz). The value of the cut-off frequency is selected such that harmonics of interest in the gimbal data are not attenuated.

The data for the stiffness torque parameter identification is generated by moving the gimbal at a constant rate over the operating range in both CW and CCW directions. The telemetry from this maneuver is used for both stiffness torque and ripple torque parameter identification. A subset of this data is separated into CW and CCW motion, with starting, turn-around and ending portions discarded. A second order polynomial is used for the compensation of residual and stiffness torque. The coefficients are determined using a least squares fit.

The harness residual and stiffness torque is describes by the following expression.

$$T_{Harness} = A_0 + A_1(\theta) + A_2(\theta)^2 \qquad \text{Eq. 5}$$

θ is the gimbal angle, and $A_0$, $A_1$, $A_2$ are constant coefficients of the polynomial equation. In matrix form the above expression is written as follows.

$$\begin{bmatrix} \vdots \\ T_{Harness} \\ \vdots \end{bmatrix} = \begin{bmatrix} \vdots & \vdots & \vdots \\ 1 & \theta & \theta^2 \\ \vdots & \vdots & \vdots \end{bmatrix} \begin{bmatrix} A_0 \\ A_1 \\ A_2 \end{bmatrix} \qquad \text{Eq. 6}$$

For ease of manipulation, the above matrix equation may be rewritten as follows.

$$T = H \cdot \hat{y} \qquad \text{Eq. 7}$$

The solution to the unknown coefficients contained in ŷ is found by performing standard matrix operations. For example, the MATLAB function "pinv" may be used to calculate the pseudo-inverse of H.

$$\hat{y} = (H^T H)^{-1} H^T T = pinv(H) \cdot T \qquad \text{Eq. 8}$$

These computations are performed for CW and CCW data sets. The averages of the solutions to the coefficients are the calibrated parameter values for disturbance compensation compensation. Algorithm processing returns a plot showing the estimated residual and stiffness torque for the range analyzed. CW and CCW estimations are shown, along with the average value.

The data for torque ripple parameter identification may be generated in the same manner as described above respecting the stiffness torque compensation parameter identification. The torque may be detrended by removing stiffness torque from the measured values. The stiffness torque may be determined by the parameter identification also described above. Torque ripple parameters may be identified using a least squares fit. The user can specify the harmonic frequencies, k, used in the fit. The processing for parameter estimation does not limit the number of frequencies used; however, disturbance compensation software has allocation for compensation of five harmonics. Note that for purposes of disturbance compensation and this calibration process, the fundamental frequency is referenced as a harmonic and counts toward one of the five available software locations for compensation.

The torque ripple can be described by the following expressions.

$$T_{ripple,CW} = \Sigma A_{CW,n} \cos(k_n \theta_{CW}) + B_{CW,n} \sin(k_n \theta_{CW}) \qquad \text{Eq. 9}$$

$$T_{ripple,CCW} = \Sigma A_{CCW,n} \cos(k_n \theta_{CCW}) + B_{CCW,n} \sin(k_n \theta_{CCW}) \qquad \text{Eq. 10}$$

θ is the gimbal angle, k is the harmonic frequency, and n identifies the harmonic. The coefficients $A_{CW}$, $B_{CW}$, $A_{CCW}$ and $B_{CCW}$ are constants that describe the disturbance for the indicated direction of motion. Using matrix notation, these equations are expressed as follows.

$$\begin{bmatrix} \begin{bmatrix} \vdots \\ T_{Ripple,CW} \\ \vdots \end{bmatrix} \\ \begin{bmatrix} \vdots \\ T_{Ripple,CCW} \\ \vdots \end{bmatrix} \end{bmatrix} = \qquad \text{Eq. 11}$$

$$\begin{bmatrix} \begin{bmatrix} \vdots \\ \cos(k_n \theta_{CW}) \\ \vdots \end{bmatrix} & \begin{bmatrix} \vdots \\ \sin(k_n \theta_{CW}) \\ \vdots \end{bmatrix} & 0 & 0 \\ 0 & 0 & \begin{bmatrix} \vdots \\ \cos(k_n \theta_{CCW}) \\ \vdots \end{bmatrix} & \begin{bmatrix} \vdots \\ \sin(k_n \theta_{CCW}) \\ \vdots \end{bmatrix} \end{bmatrix} \begin{bmatrix} A_{CW,n} \\ B_{CW,n} \\ A_{CCW,n} \\ B_{CCW,n} \end{bmatrix}$$

The coefficients can be written as the sum of a torque independent term and a torque dependent term.

$$A_{CW,n} = A_{TI,n} + \overline{T}_{CW} A_{TD,n} \qquad \text{Eq. 12}$$
$$B_{CW,n} = B_{TI,n} + \overline{T}_{CW} B_{TD,n}$$
$$A_{CCW,n} = A_{TI,n} + \overline{T}_{CCW} A_{TD,n}$$
$$B_{CCW,n} = B_{TI,n} + \overline{T}_{CCW} B_{TD,n}$$

or equivalently $$\begin{bmatrix} A_{CW,n} \\ B_{CW,n} \\ A_{CCW,n} \\ B_{CCW,n} \end{bmatrix} = \begin{bmatrix} 1 & \overline{T}_{CW} & 0 & 0 \\ 0 & 0 & 1 & \overline{T}_{CW} \\ 1 & \overline{T}_{CCW} & 0 & 0 \\ 0 & 0 & 1 & \overline{T}_{CCW} \end{bmatrix} \begin{bmatrix} A_{TI,n} \\ A_{TD,n} \\ B_{TI,n} \\ B_{TD,n} \end{bmatrix}$$

Substituting these expressions into the torque ripple expressions shown in and Eq. 9 and Eq. 10 yields the following equations and matrices.

$$T_{ripple,CW} = \sum A_{TI,n} \cos(k_n \theta) + B_{TI,n} \sin(k_n \theta) + \overline{T}_{CW} \left[ \sum A_{TD,n} \cos(k_n \theta) + B_{TD,n} \sin(k_n \theta) \right] \qquad \text{Eq. 13}$$

-continued $$T_{ripple,CCW} = \sum A_{TI,n}\cos(k_n\theta) + B_{TI,n}\sin(k_n\theta) + \overline{T}_{CCW}\left[\sum A_{TD,n}\cos(k_n\theta) + B_{TD,n}\sin(k_n\theta)\right] \quad \text{Eq. 14}$$

$$\begin{bmatrix} \begin{bmatrix} \vdots \\ T_{Ripple,CW} \\ \vdots \end{bmatrix} \\ \begin{bmatrix} \vdots \\ T_{Ripple,CCW} \\ \vdots \end{bmatrix} \end{bmatrix} = \begin{bmatrix} \begin{bmatrix} \vdots \\ \cos(k_n\theta_{CW}) \\ \vdots \end{bmatrix} & \begin{bmatrix} \vdots \\ \cos(k_n\theta_{CW})\cdot{}^*T_{CW} \\ \vdots \end{bmatrix} & \begin{bmatrix} \vdots \\ \sin(k_n\theta_{CW}) \\ \vdots \end{bmatrix} & \begin{bmatrix} \vdots \\ \sin(k_n\theta_{CW})\cdot{}^*T_{CW} \\ \vdots \end{bmatrix} \\ \begin{bmatrix} \vdots \\ \cos(k_n\theta_{CCW}) \\ \vdots \end{bmatrix} & \begin{bmatrix} \vdots \\ \cos(k_n\theta_{CCW})\cdot{}^*T_{CCW} \\ \vdots \end{bmatrix} & \begin{bmatrix} \vdots \\ \sin(k_n\theta_{CCW}) \\ \vdots \end{bmatrix} & \begin{bmatrix} \vdots \\ \sin(k_n\theta_{CCW})\cdot{}^*T_{CCW} \\ \vdots \end{bmatrix} \end{bmatrix} \begin{bmatrix} A_{TI,n} \\ A_{TD,n} \\ B_{TI,n} \\ B_{TD,n} \end{bmatrix}$$

Matrix equation 15 is above. For ease of manipulation, the above matrix equation is written as follows.

$$T = H \cdot \hat{x} \quad \text{Eq. 16}$$

The solution to the unknown coefficients contained in $\hat{x}$ may be found by performing standard matrix operations. For example, the MATLAB function "pinv" may be used to calculate the pseudo-inverse of H.

$$\hat{x} = (H^T H)^{-1} H^T T = \text{pinv}(H) \cdot T \quad \text{Eq. 17}$$

These coefficients may be used to determine the magnitudes and phases corresponding to the ripple harmonics. The ripple disturbance in disturbance compensation is represented as a magnitude and a sine evaluation of the gimbal angle and a phase term, which is equivalent to the sine and cosine expressions used in the least squares fit.

$$T_{ripple,TI} = \Sigma P_{TI,n}\sin(k_n\theta + \phi_{TI,n}) = \Sigma A_{TI,n}\cos(k_n\theta) + B_{TI,n}\sin(k_n\theta) \quad \text{Eq. 18}$$

$$T_{ripple,TD} = T_{cmd}\Sigma P_{TD,n}\sin(k_n\theta + \phi_{TD,n}) = T_{cmd}\Sigma A_{TD,n}\cos(k_n\theta) + B_{TD,n}\sin(k_n\theta) \quad \text{Eq. 19}$$

Magnitudes and phase terms may be computed from the coefficients as follows.

$$\phi_{TI,n} = \tan^{-1}\left(\frac{A_{TI,n}}{B_{TI,n}}\right) \quad \text{Eq. 20}$$

$$P_{TI,n} = \sqrt{(A_{TI,n})^2 + (B_{TI,n})^2}$$

$$\phi_{TD,n} = \tan^{-1}\left(\frac{A_{TD,n}}{B_{TD,n}}\right) \quad \text{Eq. 21}$$

$$P_{TD,n} = \sqrt{(A_{TD,n})^2 + (B_{TD,n})^2}$$

The MATLAB function "atan2" may be used to determine the phase angles.

Spatial FFT plots may be generated during the algorithm processing to aid in identifying dominant harmonics in the torque ripple. The FFT plots may be shown for torque data with the linear trend of the twist capsule removed. Plots for both raw and filtered torque data may then be derived. If large magnitudes appear in the FFT plots at harmonics not fit during least squares processing, the user can update the input file with modified values for k and re-execute the parameter estimation.

4.2 Hysteresis Disturbances

As previously mentioned, the parameters employed in disturbance compensation processing in the gimbal control software on board the spacecraft may comprise uploadable constants and this allows the parameters to be updated for the post-launch, on-orbit environment of the payload and gimbal assembly. The steps to calibrate these parameters may be divided into separate algorithms corresponding to the different disturbance compensations in disturbance compensation. The following equations describe the calibration of the friction hysteresis model parameters for disturbance compensation. The calibration of the remaining disturbance model parameters has been previously discussed in section 4.1 above.

The hysteresis compensation residing in the disturbance compensation is of the form in Eq. 22 below. These equations represent two copies of the static Dahl friction model, one for the bearing disturbance and one for the motor. See Dahl, P. R., "A Solid Friction Model" TOR-158 (3107-18)-01, The Aerospace Corporation, May 1968, which is in incorporated by reference herein. The hysteresis parameter identification problem is to design a calibration procedure to estimate the model parameters: Dahl stiffness coefficient $\gamma$, Coulomb friction $T_{Coulomb}$, and Dahl model exponent i.

$$\frac{dT_{Bearing}}{dt} = \gamma_{Bearing} \left|1 - \frac{T_{Bearing}}{T_{Coulomb,Bearing}} sgn(\omega_{Gimbal})\right|^{i\_Bearing} \quad \text{Eq. 22}$$

$$sgn\left(1 - \frac{T_{Bearing}}{T_{Coulomb,Bearing}} sgn(\omega_{Gimbal})\right) \omega_{Gimbal}$$

$$\frac{dT_{Motor}}{dt} = \gamma_{Motor} \left|1 - \frac{T_{Motor}}{T_{Coulomb,Motor}} sgn(\omega_{Gimbal})\right|^{i\_Motor}$$

$$sgn\left(1 - \frac{T_{Motor}}{T_{Coulomb,Motor}} sgn(\omega_{Gimbal})\right) \omega_{Gimbal}$$

where, $\omega_{Gimbal}$ is the gimbal rate, $T_{Bearing}, T_{Motor}$ are the modeled friction torques of the bearing and motor, respectively, $\gamma_{Bearing}, \gamma_{Motor}$ are the Dahl stiffness coefficients of the bearing and motor, respectively, $T_{Coulomb,Bearing}, T_{Coulomb,Motor}$ are the Coulomb friction torques of the bearing and motor, respectively, i_Bearing, i_Motor are the Dahl model exponents for the bearing and motor, respectively.

Hysteresis friction data may be collected during a calibration maneuver, designed to exercise the gimbal in such a way as to produce hysteretic loops due to bearing and motor friction. The gimbal position commands may comprise a decaying sinusoid, commanded at a gimbal axis-at-a-time, while the other axis receives a constant angle command. The frequency and amplitude should produce position and rates high enough such that the Coulomb friction level is achieved. Since commanded torque is used as a measure of the gimbal disturbance, the control error signal should remain small. The processing described in this section assumes an appropriate maneuver has been executed by the gimbal and that measured position and command torque data has been collected. The processing may proceed as described hereafter.

The calibration data requires some straight-forward extraction and filtering, which is described hereafter. The calibration data may be filtered to reduce high frequency noise using a 0.5 Hz fourth-order Butterworth filter. For example, since the data is post-processed on the ground, the MATLAB function "filtfilt.m" may be used to process the data through the filter forward and backward to produce zero phase distortion. However, starting and ending transients may require the data to be further truncated after filtering. The position data may be processed in a similar fashion.

The calibration algorithm requires an estimate of the rate and acceleration of the gimbal. A simple backward difference may be used to provide a rate estimate. The rate estimate is an input to the Dahl hysteresis friction model. The rate data may then used to derive an acceleration estimate. The acceleration estimate can be used to identify mismatches between the commanded torque signal and the gimbal acceleration derived from the measured position data. An additional constraint to the data extraction is that the extracted data set should start at or near a zero gimbal rate. This aids in reducing any initial condition errors in the simulation data produced during the parameter identification. For other effects, e.g. ripple and twist-capsule effects, current estimates may be used to remove them applied in the command torque signal. This results in a torque signal containing primarily bearing and motor torque. This torque data vector and corresponding rate and acceleration data may be compared against a MATLAB SIMULINK model of the process. The parameter identification algorithm discussed in the following section selects model parameters to minimize the norm between the measured torque signal and that predicted by the model.

The problem of identifying the model parameters may be solved using a gradient descent optimization. For example, consider a scalar valued process $y(t) = g(u(t-\tau))$ described by the sequence, $$\vec{Y} = \begin{bmatrix} y(t_0) \\ y(t_1) \\ \vdots \\ y(t_n) \end{bmatrix}, \quad \text{Eq. 23}$$

$$\vec{U} = \begin{bmatrix} u(t_0) \\ u(t_1) \\ \vdots \\ u(t_n) \end{bmatrix}$$

The data vector $\vec{Y}$ represents the measured torque signal and represents the measured gimbal rate and acceleration, and the process g is unknown. This process g may be approximated as $$\hat{y}(t) = f(\vec{p}, u(t-\tau)), \tau \le t$$

where f depends on the m parameters $$\vec{p} = \begin{bmatrix} p_1 \\ p_2 \\ \vdots \\ p_m \end{bmatrix} \quad \text{Eq. 24}$$

For the Hysteresis problem, the function f and parameters $\vec{p}$ are described in Eq. 22.

For the input sequence $\vec{U}$ and the k-th parameter estimate $\vec{p}_k$, the estimate of $\vec{Y}$ is $$\vec{\hat{Y}} \begin{bmatrix} \hat{y}(t_0) \\ \hat{y}(t_1) \\ \vdots \\ \hat{y}(t_n) \end{bmatrix}, \quad \text{Eq. 25}$$

$$\hat{y}(t_i) = f(\vec{p}_k, u(t_i - \tau)),$$

$$\tau \le t_i$$

The gradient of $\vec{\hat{Y}}$ at $\vec{p}_k$ may be computed as $$\left.\frac{\nabla \vec{\hat{Y}}}{\nabla \vec{p}}\right|_k = \left[\frac{\vec{\hat{Y}}_k(\vec{p}_k + \Delta \vec{p}_{k-1} I_1) - \vec{\hat{Y}}_k(\vec{p}_k)}{\Delta \vec{p}_{k-1}}\right. \quad \text{Eq. 26}$$

$$\left.\frac{\vec{\hat{Y}}_k(\vec{p}_k + \Delta \vec{p}_{k-2} I_2) - \vec{\hat{Y}}_k(\vec{p}_k)}{\Delta \vec{p}_{k-2}} \cdots \frac{\vec{\hat{Y}}_k(\vec{p}_k + \Delta \vec{p}_{k-m} I_m) - \vec{\hat{Y}}_k(\vec{p}_k)}{\Delta \vec{p}_{k-m}}\right]$$

where $\Delta \vec{p}_{k-1}$ is the pertubation of $\vec{p}_k$ at iteration k and $I_i$ is a m×1 vector of all zeros except the ith entry, which is set to 1

Then given the damping factor $0<\alpha<1$, the parameter update is:

$$\vec{p}_k = \vec{p}_{k-1} + \alpha \left[ \left( \frac{\nabla \vec{Y}}{\nabla \vec{p}} \bigg|_k \right)^T \frac{\nabla \vec{Y}}{\nabla \vec{p}} \bigg|_k \right]^{-1} \left( \frac{\nabla \vec{Y}}{\nabla \vec{p}} \bigg|_k \right)^T \left( \vec{Y} - \vec{Y}_k \right) \quad \text{Eq. 27}$$

The parameter iteration continues until either a maximum iteration limit is reached or the rate of convergence falls below a user specified threshold.

In the optimization problem $\vec{Y}$ contains the post-processed torque data and $\vec{U}$ contains the gimbal rate data and any auxiliary data required by the friction model. The friction model $\hat{y}(t)=f(\vec{p},u(t-\tau))$ is represented as a MATLAB SIMULINK model. The algorithm process numerically computes the gradient of this function in Eq. 26.

The algorithm processing is structured to be flexible to friction modeling. Updates to the friction model in MATLAB SIMULINK are transparent to the optimization processing. This structure should be preserved, since it does not add significant processing complexity and makes for a robust design. The algorithm processing also allows for a subset of the parameter vector to be optimized.

5. Gimbal Disturbance Compensation

Figure 7A:
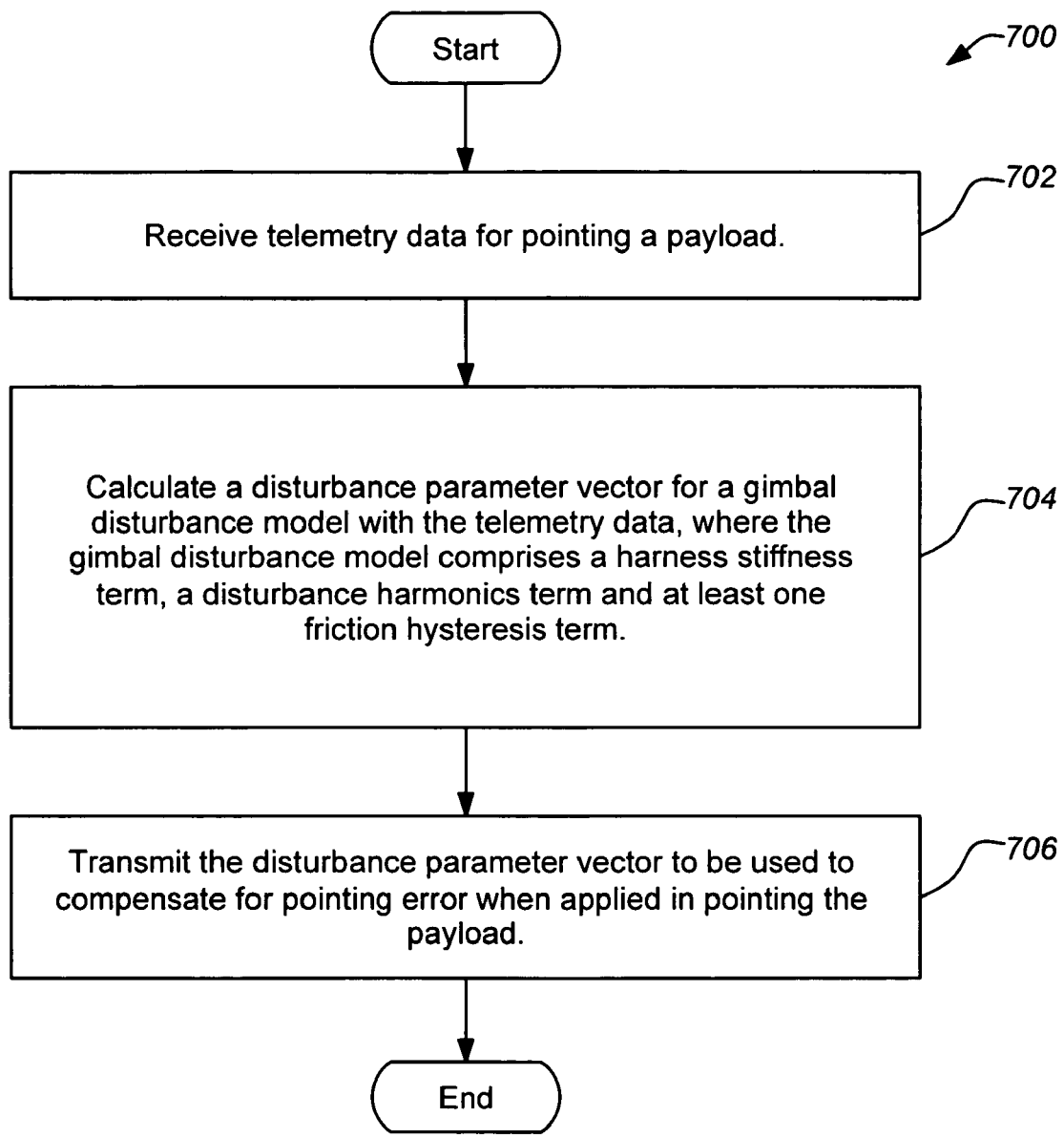
FIG. 7A is a flowchart of an exemplary disturbance parameter calibration method of the invention.

FIG. 7A is a flowchart of an exemplary disturbance parameter calibration method 700 of the invention. In operation 702, telemetry data for pointing a payload is received. In operation 704, a disturbance parameter vector is calculated for a gimbal disturbance model with the telemetry data. The gimbal disturbance model comprises a harness stiffness term, a disturbance harmonics term and at least one friction hysteresis term. Finally in operation 706, the disturbance parameter vector is transmitted to the gimbal controller to be used to compensate for pointing error when applied in pointing the payload. As previously described, the disturbance parameter vector may be computed with an iterative gradient computation.

Figure 7B:
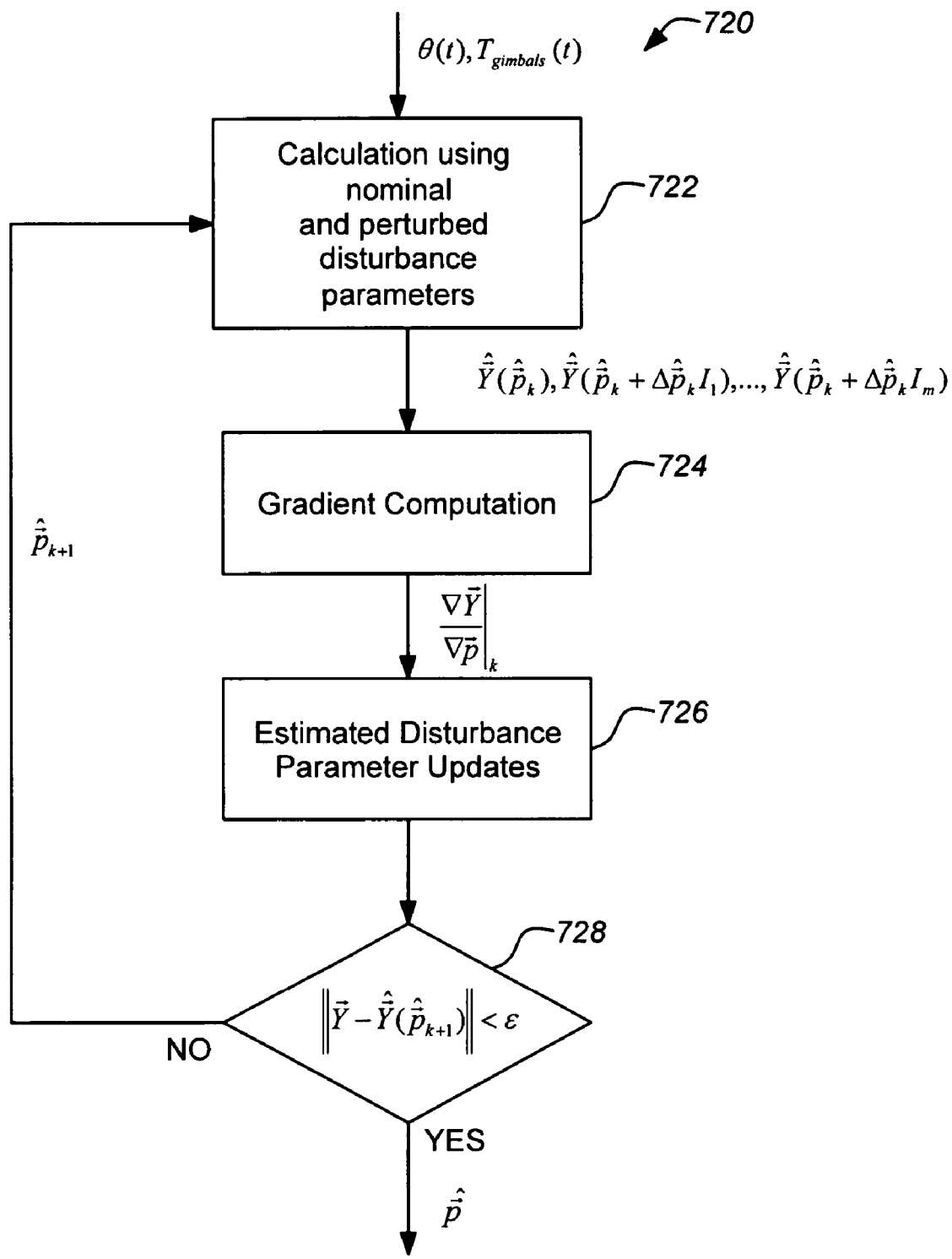
FIG. 7B shows an exemplary disturbance parameter calibration method for performing convergence of an iterative gradient computation with the telemetry data for embodiments of the invention.

FIG. 7B shows an exemplary method 720 for performing convergence of an iterative gradient computation with the telemetry data for embodiments of the invention. The received telemetry data (e.g. applied torque and gimbal angle) are applied in calculations with nominal and perturbed gimbal disturbance parameters in operation 722. In operation 722 the time history of estimated rates may be used as inputs to Eq. 22 with an initial guess of parameters. For each parameter a perturbation can be made to that parameter and the time response of Eq. 22 is repeated. Performing this for each parameter, each of the terms of the numerators in Eq 26 can be generated. Next in operation 724, the gradient computation is performed. Operation 724 takes all the torque time histories generated in operation 722 and forms the matrix in Eq 26. Following this in operation 726, the estimated disturbance parameters are updated (in Eq. 27). In decision block 728, a difference evaluation is made to determine whether the difference between the current and previous values is below a predetermined threshold. If it is, the calculation of the disturbance parameter vector is complete. If it is not, the method returns to operation 722 to be repeated.

Figure 8:
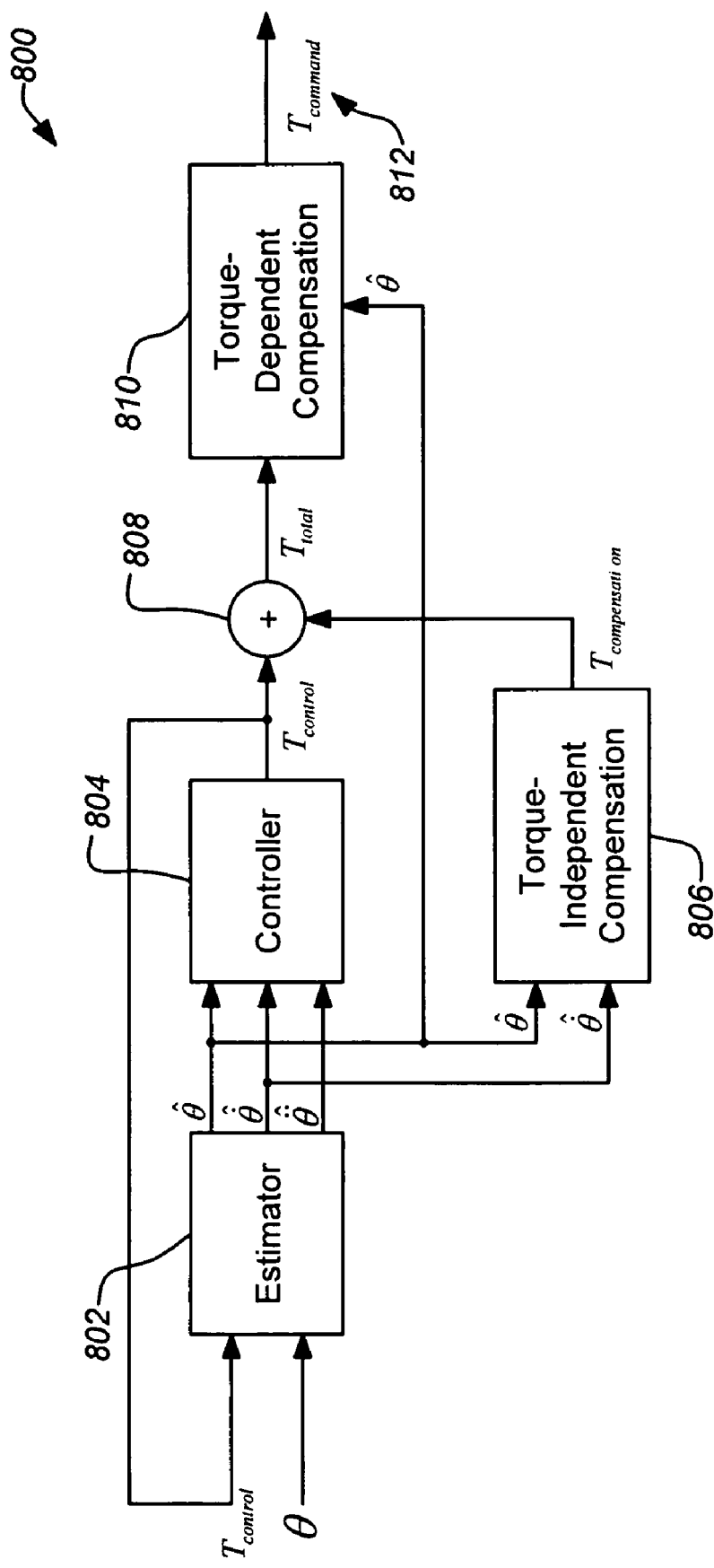
FIG. 8 is a block diagram of a gimbal disturbance compensation embodiment of the invention.

FIG. 8 is a block diagram of a gimbal disturbance compensation embodiment of the invention. The on board gimbal control system 800 includes an estimator 802 which receives gimbal angle and applied torque as input. The outputs of the estimator 802 are estimates for the angular position, rate and acceleration of the gimbal. Thes estimates are fed into the controller 804 which yields the applied torque as output. The angular position and rate estimates from the estimator 802 are also used as input to the torque-independent compensation processor 806. Using these inputs, the torque-independent compensation may be computed as follows, $$T_{compensation} = \hat{T}_{stiffness} + \hat{T}_{harmonics} + \hat{T}_{hysteresis}$$

$$\hat{T}_{stiffness} = \hat{T}_0 + \hat{k}_1(\hat{\theta} - \theta_0) + \hat{k}_2(\hat{\theta} - \theta_0)^2$$

$$\hat{T}_{harmonics} = \sum_{i=1}^{m} \hat{a}_i \sin(i\omega_0 \hat{\theta} + \hat{\psi}_i)$$

$$\hat{T}_{hysteresis} = \hat{T}_{hysteresis\_bearing} + \hat{T}_{hysteresis\_motor} + \hat{T}_{hysteresis\_harness}$$

$$\hat{T}_{hysteresis\_bearing} = \hat{\gamma}_{bearing} \left| 1 - \frac{\hat{T}_{hysteresis\_bearing} sign(\hat{\theta})}{\hat{T}_{bearing}} \right|^n \hat{\theta}$$

$$\hat{T}_{hysteresis\_motor} = \hat{\gamma}_{motor} \left| 1 - \frac{\hat{T}_{hysteresis\_motor} sign(\hat{\theta})}{\hat{T}_{motor}} \right|^n \hat{\theta}$$

$$\hat{T}_{hysteresis\_harness} = \hat{\gamma}_{harness} \left| 1 - \frac{\hat{T}_{hysteresis\_harness} sign(\hat{\theta})}{\hat{T}_{harness}} \right|^n \hat{\theta}$$

The torque-independent compensation processor 806 employs a harness stiffness term, a disturbance harmonics term and at least one friction hysteresis term. In the example, a plurality of Dahl friction hysteresis terms are used to determine the hysteresis component of the torque-independent compensation. The torque-independent compensation processor 806 performs the foregoing calculations employing parameters from the disturbance parameter vector which is calculated as described above and transmitted to the satellite. The output of the torque-independent compensation processor 806 is the compensation torque. The compensation torque is added to the applied torque in the summation block 808 to yield a total torque value. The total torque value is then input to the torque-dependent compensation processor 810.

The torque dependent compensation may be computed from $$T_{command} = \frac{T_{total}}{1 + \sum_{j=1}^{n} b_j \sin(j\omega_0 \theta + \phi_j)}.$$

This compensation represents the torque-dependent component of the harmonics disturbance as shown in the disturbance modeling above. Here also, the torque-dependent compensation processor 810 performs the foregoing calculations employing parameters from the disturbance parameter vector which is calculated as described above and transmitted to the satellite. The output of the torque-dependent compensation processor 810 is the torque command 812 which is then applied to the gimbal, resulting in reduced error in pointing the payload.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus, comprising:
   a receiver for receiving telemetry data for pointing a payload with a gimbal;
   a processor for calculating a disturbance parameter vector for a gimbal disturbance model of the gimbal with the telemetry data where the gimbal disturbance model comprises a harness stiffness term, a disturbance harmonics term and at least one friction hysteresis term; and
   a transmitter for transmitting the disturbance parameter vector to apply to control of the gimbal to compensate for pointing error when applied in pointing the payload.

2. The apparatus of claim 1, wherein the telemetry data results from operating the gimbal with a constant rate command profile and a decaying sinusoidal angle profile.

3. The apparatus of claim 1, wherein the telemetry data is time matched prior to calculating the disturbance parameter vector.

4. The apparatus of claim 1, wherein the disturbance parameter vector is calculated from convergence of an iterative gradient computation with the telemetry data.

5. The apparatus of claim 1, wherein the harness stiffness term of the gimbal disturbance model comprises $T_0 + k_1(\theta - \theta_0) + k_2(\theta - \theta_0)^2$, where $T_0$ is a harness bias, $k_1$ is a harness stiffness, $k_2$ is a harness quadratic stiffness, $\theta$ is a gimbal angle and $\theta_0$ is a gimbal angle offset.

6. The apparatus of claim 1, wherein the disturbance harmonics term of the gimbal disturbance model comprises a gimbal torque independent term and a gimbal torque dependent term substantially proportional to applied gimbal torque.

7. The apparatus of claim 6, wherein the gimbal torque independent term comprises $$\sum_{i=1}^{m} a_i \sin(i\omega_0 \theta + \psi_i),$$

where $a_i$ is an i-th harmonic amplitude, $\omega_0$ is a fundamental spatial frequency, and $\psi_i$ is an i-th phase offset parameter.

8. The apparatus of claim 6, wherein the gimbal torque dependent term comprises $$T_{gimbals} \sum_{j=1}^{n} b_j \sin(j\omega_0 \theta + \phi_j),$$

where $T_{gimbals}$ is an applied gimbal torque, $b_j$ is a j-th harmonic amplitude, $\omega_0$ is a fundamental spatial frequency, and $\phi_j$ is a j-th phase offset parameter.

9. The apparatus of claim 1, wherein the at least one friction hysteresis term of the gimbal disturbance model comprises a plurality of Dahl friction hysteresis terms.

10. The apparatus of claim 9, where the plurality of Dahl friction hysteresis terms comprise $$\gamma_{bearing} \left| 1 - \frac{T_{hysteresis\_bearing} sign(\dot\theta)}{T_{bearing}} \right|^n \dot\theta,$$

$$\gamma_{motor} \left| 1 - \frac{T_{hysteresis\_motor} sign(\dot\theta)}{T_{motor}} \right|^n \dot\theta \text{ and } \gamma_{harness} \left| 1 - \frac{T_{hysteresis\_harness} sign(\dot\theta)}{T_{harness}} \right|^n \dot\theta$$

where t is time. $\gamma_{bearing}$, $\gamma_{motor}$, $\gamma_{harness}$ are friction stiffness parameters of a gimbal bearing, motor, and harness, respectively, $T_{hysteresis\_bearing}$, $T_{hysteresis\_motor}$, $T_{hysteresis\_harness}$ are respectively current modeled values of bearing torque, hysteresis torque, and harness torque, and $T_{bearing}$, $T_{motor}$, $T_{harness}$ are Columb friction levels of the gimbal bearing, motor, and harness, respectively.

11. A method, comprising:
    receiving telemetry data for pointing a payload with a gimbal;
    calculating a disturbance parameter vector for a gimbal disturbance model of the gimbal with the telemetry data where the gimbal disturbance model comprises a harness stiffness term, a disturbance harmonics term and at least one friction hysteresis term; and
    transmitting the disturbance parameter vector to apply to control of the gimbal to compensate for pointing error when applied in pointing the payload.

12. The method of claim 11, wherein the telemetry data results from operating the gimbal with a constant rate command profile and a decaying sinusoidal angle profile.

13. The method of claim 11, wherein the telemetry data is time matched prior to calculating the disturbance parameter vector.

14. The method of claim 11, wherein the disturbance parameter vector is calculated from convergence of an iterative gradient computation with the telemetry data.

15. The method of claim 11, wherein the harness stiffness term of the gimbal disturbance model comprises $T_0 + k_1(\theta - \theta_0) + k_2(\theta - \theta_0)^2$, where $T_0$ is a harness bias, $k_1$ is a harness stiffness, $k_2$ is a harness quadratic stiffness, $\theta$ is a gimbal angle and $\theta_0$ is a gimbal angle offset.

16. The method of claim 11, wherein the disturbance harmonics term of the gimbal disturbance model comprises a gimbal torque independent term and a gimbal torque dependent term substantially proportional to applied gimbal torque.

17. The method of claim 16, wherein the gimbal torque independent term comprises $$\sum_{i=1}^{m} a_i \sin(i\omega_0 \theta + \psi_i),$$

where $a_i$ is an i-th harmonic amplitude, $\omega_0$ is a fundamental spatial frequency, and $\psi_i$ is an i-th phase offset parameter.

18. The method of claim 16, wherein the gimbal torque dependent term comprises $$T_{gimbals} \sum_{j=1}^{n} b_j \sin(j\omega_0 \theta + \phi_j),$$

where $T_{gimbals}$ is an applied gimbal torque, $b_j$ is a j-th harmonic amplitude, $\omega_0$ is a fundamental spatial frequency, and $\phi_j$ is a j-th phase offset parameter.

19. The method of claim 11, wherein the at least one friction hysteresis term of the gimbal disturbance model comprises a plurality of Dahl friction hysteresis terms.

20. The method of claim 19, where the plurality of Dahl friction hysteresis terms comprise $$\gamma_{bearing}\left|1 - \frac{T_{hysteresis\_bearing}sign(\dot{\theta})}{T_{bearing}}\right|^n \dot{\theta},$$

$$\gamma_{motor}\left|1 - \frac{T_{hysteresis\_motor}sign(\dot{\theta})}{T_{motor}}\right|^n \dot{\theta} \text{ and } \gamma_{harness}\left|1 - \frac{T_{hysteresis\_harness}sign(\dot{\theta})}{T_{harness}}\right|^n \dot{\theta}$$

where t is time. $\gamma_{bearing}$, $\gamma_{motor}$, $\gamma_{harness}$ are friction stiffness parameters of a gimbal bearing, motor, and harness, respectively, $T_{hysteresis\_bearing}$, $T_{hysteresis\_motor}$, $T_{hysteresis\_harness}$ are respectively current modeled values of bearing torque, hysteresis torque, and harness torque, and $T_{bearing}$, $T_{motor}$, $T_{harness}$ are Columb friction levels of the gimbal bearing, motor, and harness, respectively.

21. An apparatus, comprising:
a torque-independent compensation processor for calculating a compensation torque from estimates of angular position and rate of a gimbal applied to a harness stiffness term, a disturbance harmonics term and at least one friction hysteresis term; and
a torque-dependent compensation processor for calculating a torque command for the gimbal from a total applied gimbal torque;
where the total applied gimbal torque comprises a sum of the compensation torque and a control torque value.

22. The apparatus of claim 21, wherein the at least one friction hysteresis term of the gimbal disturbance model comprises a plurality of Dahl friction hysteresis terms.

23. The apparatus of claim 21, further comprising:
an estimator for providing the estimates of the angular position and rate as well as angular acceleration estimate from the control torque value and a gimbal position measurement; and
a controller for determining the control torque value from the estimates of the angular position and rate as well as the angular acceleration estimate.

* * * * *